US012593048B2

(12) United States Patent
Xiu et al.

(10) Patent No.: US 12,593,048 B2
(45) Date of Patent: **\*Mar. 31, 2026**

(54) METHODS AND APPARATUS ON PREDICTION REFINEMENT WITH OPTICAL FLOW

(71) Applicant: BEIJING DAJIA INTERNET INFORMATION TECHNOLOGY CO., LTD., Beijing (CN)

(72) Inventors: Xiaoyu Xiu, San Diego, CA (US);
Yi-Wen Chen, San Diego, CA (US);
Xianglin Wang, San Diego, CA (US);
Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,118

(22) Filed: Sep. 4, 2024

(65) Prior Publication Data

US 2024/0430438 A1     Dec. 26, 2024

Related U.S. Application Data

(63) Continuation of application No. 17/571,434, filed on Jan. 7, 2022, now Pat. No. 12,132,910, which is a
(Continued)

(51) Int. Cl.
H04N 19/137 (2014.01)
H04N 19/105 (2014.01)
(Continued)

(52) U.S. Cl.
CPC ......... H04N 19/137 (2014.11); H04N 19/105 (2014.11); H04N 19/132 (2014.11); H04N 19/159 (2014.11); H04N 19/176 (2014.11)

(58) Field of Classification Search
CPC .. H04N 19/137; H04N 19/105; H04N 19/132; H04N 19/159; H04N 19/176;
(Continued)

(56) References Cited

U.S. PATENT DOCUMENTS

| | | |
|---|---|---|
| 2018/0262773 A1 | 9/2018 | Chuang et al. |
| 2019/0141333 A1 | 5/2019 | Lee |

(Continued)

FOREIGN PATENT DOCUMENTS

| | | |
|---|---|---|
| CN | 106664416 A | 5/2017 |
| CN | 107925775 A | 4/2018 |

(Continued)

OTHER PUBLICATIONS

Xiaoyu Xiu et al., Kwai Inc, "CE4-related: Harmonization of BDOF and PROF", Joint Video Experts Team(JVET) of ITU-T SG 16 WP 3 and ISO/IEC JTC 1/SC 29/WG 11, JVET-O0593-r1, 15th Meeting, Gothenburg, SE, Jul. 3-12, 2019,(6p).
(Continued)

*Primary Examiner* — Hesham K Abouzahra
(74) *Attorney, Agent, or Firm* — Arch & Lake LLP; Hao Tan; Shen Wang

(57) ABSTRACT

Methods, apparatuses, and non-transitory computer-readable storage mediums are provided for video encoding. The method includes dividing a video block to multiple non-overlapped video subblocks, dividing a video block to multiple non-overlapped video subblocks, determining a first reference picture $I^{(0)}$ and a second reference picture $I^{(1)}$, determining first prediction samples $I^{(0)}(i,j)$'s, determining second prediction samples $I^{(1)}(i,j)$'s, determining horizontal and vertical gradient values of the first prediction samples $I^{(0)}(i,j)$'s and second prediction samples $I^{(1)}(i,j)$'s, determining motion refinements for samples in video subblock based on the BDOF when the video block is not coded in affine
(Continued)

mode, determining motion refinements for samples in the video subblock based on the PROF when the video block is coded in affine mode, and determining prediction samples of the video block based on the motion refinements.

20 Claims, 13 Drawing Sheets

Related U.S. Application Data continuation of application No. PCT/US2020/041701, filed on Jul. 10, 2020.

(60) Provisional application No. 62/873,837, filed on Jul. 12, 2019, provisional application No. 62/872,700, filed on Jul. 10, 2019.

(51) Int. Cl.
H04N 19/132 (2014.01)
H04N 19/159 (2014.01)
H04N 19/176 (2014.01)

(58) Field of Classification Search
CPC .... H04N 19/44; H04N 19/573; H04N 19/109; H04N 19/513; H04N 19/577; H04N 19/119
See application file for complete search history.

(56) References Cited

U.S. PATENT DOCUMENTS

| | | | | |
|---|---|---|---|---|
| 2020/0314444 | A1 | 10/2020 | Lee et al. | |
| 2020/0322607 | A1* | 10/2020 | Hsiang | H04N 19/13 |
| 2022/0210439 | A1* | 6/2022 | Lai | H04N 19/12 |
| 2022/0264146 | A1* | 8/2022 | Chen | H04N 19/107 |

FOREIGN PATENT DOCUMENTS

| | | |
|---|---|---|
| CN | 108886618 A | 11/2018 |
| WO | 2017164441 A1 | 9/2017 |
| WO | 2018048265 A1 | 3/2018 |
| WO | 2018169923 A1 | 9/2018 |
| WO | 2019010156 A1 | 1/2019 |
| WO | 2019117640 A1 | 6/2019 |

OTHER PUBLICATIONS

Xiaoyu Xiu et al., Kwai Inc, "CE4-related: Prediction sample padding unification for BDOF and PROF", Joint Video Experts Team(JVET) of ITU-T SG 16 WP 3 and ISO/IEC JTC 1/SC 29/WG 11, JVET-O0594, 15th Meeting, Gothenburg, SE, Jul. 3-12, 2019,(4p).

Hang Huang et al., Qualcomm, "CE4-related: Alignment and simplification of PROF and BDOF", Joint Video Experts Team(JVET) of ITU-T SG 16 WP 3 and ISO/IEC JTC 1/SC 29/WG 11, JVET-O0252, 15th Meeting, Gothenburg, SE, Jul. 3-12, 2019,(6p).

Xiaoyu Xiu et al., Kwai Inc, et al., "CE4/9-related: Combined Test of JVET-O0593/JVET-00252/JVET-00281/JVET-00615 on harmonization on BDOF and PROF", Joint Video Experts Team(JVET) of ITU-T SG 16 WP 3 and ISO/IEC JTC 1/SC 29/WG 11, JVET-O01142-v2, 15th Meeting, Gothenburg, SE, Jul. 3-12, 2019,(6p).

Kai Zhang et al., Bytedance Inc., "CE4-related: Unified padding for BDOF and PROF", Joint Video Experts Team (JVET) of ITU-T SG 16 WP 3 and ISO/IEC JTC 1/SC 29/WG 11, JVET-O0624-v1, 15th Meeting, Gothenburg, SE, Jul. 3-12, 2019,(4p).

Jiancong(Daniel) Luo et al., InterDigital Communications, Inc., "CE4-2.1: Prediction refinement with optical flow for affine mode", Joint Video Experts Team(JVET) of ITU-T SG 16 WP 3 and ISO/IEC JTC 1/SC 29/WG 11, JVET-O0070, 15th Meeting, Gothenburg, SE, Jul. 3-12, 2019,(4p).

Benjamin Bross et al., "Versatile Video Coding (Draft 9)", Joint Video Experts Team(JVET) of ITU-T SG 16 WP 3 and ISO/IEC JTC 1/SC 29/WG 11, JVET-R2001-vA, 18th Meeting, by teleconference, Apr. 15-24, 2020,(524p).

Jianle Chen et al., "Algorithm description for Versatile Video Coding and Test Model 9(VTM 9)", Joint Video Experts Team(JVET) of ITU-T SG 16 WP 3 and ISO/IEC JTC 1/SC 29/WG 11, JVET-R2002-v2, 18th Meeting, by teleconference, Apr. 15-24, 2020,(98p).

Benjamin Bross et al., "Versatile Video Coding (Draft 5)", Joint Video Experts Team(JVET) of ITU-T SG 16 WP 3 and ISO/IEC JTC 1/SC 29/WG 11, JVET-N1001-v1, 14th Meeting, Geneva,CH, Mar. 19-27, 2019,(344p).

Jianle Chen et al., "Algorithm description for Versatile Video Coding and Test Model 5 (VTM 5)", Joint Video Experts Team(JVET) of ITU-T SG 16 WP 3 and ISO/IEC JTC 1/SC 29/WG 11, JVET-N1002-v1, 14th Meeting, Geneva, CH, Mar. 19-27, 2019,(70p).

First Office Action issued to Japanese Application No. 2022-501055 dated Jun. 28, 2022 with English translation, (12p).

Xu, Xiaozhong et al., "Recent Advances in Video Coding Beyond the HEVC Standard", Overview Paper, Published online by Cambridge University Press, Jun. 25, 2019; DOI: https://doi.org/10.1017/ATSIP.2019.11, (10p).

Bross, Benjamin et al., "Versatile Video Coding (Draft 5)", Joint Video Experts Team (JVET) of ITU-T SG 16 WP 3 and ISO/IEC JTC 1/SC 29/WG11, JVET-N1001-v10, 14th Meeting: Geneva, CH Mar. 19-27, 2019, (19p).

Xiu, Xiaoyu et al., "CE4/9-related: Combined Test of JVET-O0593/JVET-00252/JVET-00281/JVET-00615 on Harmonization on BDOF and PROF", Joint Video Experts Team (JVET) of ITU-T SG 16 WP 3and ISO/IEC JTC 1/SC 29/WG11, JVET-O01142-v2, 15th Meeting: Gothenburg, SE Jul. 3-12, 2019, (29p).

Xiu, Xiaoyu et al., "CE4-related: Prediction Sample Padding Unification for BDOF and PROF", Joint Video Experts Team (JVET) of ITU-T SG 16 WP 3 and ISO/IEC JTC 1/SC 29/WG11, JVET-00594, 15th Meeting: Gothenburg, SE Jul. 3-12, 2019, (7p).

International Search Report of International Application No. PCT/US2020/041701 dated Oct. 26, 2020, (2p).

Kwai, Xiaoyu Xiu et al., "CE4-related: Prediction sample padding unification for BDOF and PROF", Joint Video Experts Team (JVET) of ITU-T SG 16 WP 3 and ISO/IEC JTC 1/SC 29/WG 1 15th Meeting: Gothenburg, SE, Jul. 3-12, 2019 Document: JVET-00594, (4p).

Qualcomm, Han Huang, et al., "CE4-related: Alignment and simplification of PROF and BDOF", Joint Video Experts Team (JVET) of ITU-T SG 16 WP 3 and ISO/IEC JTC 1/SC 29/WG 1 15th Meeting: Gothenburg, SE, Jul. 3-12, 2019 Document: JVET-00252, (8p).

Bytedance Inc., Kai Zhang et al., "CE4-related: Unified padding for BDOF and PROF" Joint Video Experts Team (JVET) of ITU-T SG 16 WP 3 and ISO/IEC JTC 1/SC 29/WG 1 15th Meeting: Gothenburg, SE, Jul. 3-12, 2019, JVET-00624-v1, (3p).

First Office Action issued ot Japanese Application No. 2022-501055 dated Jun. 28, 202 with English translation, (12p).

Xiu, Xiaozhong et al., "Recent Advances in Video Coding Beyond the HEVC Standard", Overview Paper, Published online by Cambridge University Press, Jun. 25, 2019; DOI: https://doi.org/10.1017/ATSIP.2019.11, (10p).

Bross, Benjamin et al., "Versatile Video Coding (Draft 5)", Joint Video Experts Team (JVET) of ITU-T SG 16 WP 3 and ISO/EC JTC 1/SC 29/WG11, JVET-N1001-10, 14th Meeting: Geneva, CH Mar. 19-27, 2019, (19p).

Xiu, Xiaoyu et al., "CE4/9-related: Combined Test of JVET-O0593/JVET-00252/JVET-00281/JVET-00615 on Harmonization on BDOF and PROF", Joint Video Experts Team (JVET) of ITU-T SG 16 W 3 and ISO/IEC JTC 1/SC 29/WG11, JVET-001142-v2, 15th Meeting: Gothenburg, SE Jul. 3-12, 2019, (29p).

Xiu, Xiaoyu et al., "CE4-related: Prediction Sample Padding Unification for BDOF and PROF", Joint Video Experts Team (JVET) of ITU-T SG 61 WP 3and ISO/IEC JTC 1/SC 29/WG1, JVET-00594, 15th Meeting: Gothenburg, ES Jul. 3-12, 2019, (7p).

Hongbin Liu et al., "Non-CE9: Restriction on motion vector refinement in BDOF", Joint Video Experts Team (JVET) pf ITU-T SG 16

(56) References Cited

OTHER PUBLICATIONS

WP 3 and ISO/IEC JTC 1/sc 29/WG 11, 15th Meeting: Gothenburg, SE, Jul. 3-12, 2019. JEVT-O0573 Jul. 5, 2019. (24p).

Yang et al., "CE4-related: On conditions for enabling PROF", Joint Video Experts Team (JVET) of ITU-T SG 16 WP 3 and ISO/IEC JTC 1/SC 29/WG 11, JVET-O0313, 15th Meeting: Gothenburg, SE, Jul. 3-12, 2019, (4p).

Luo et al., "CE2-related: Prediction refinement with optical flow for affine mode", Joint Video Experts Team (JVET) of ITU-T SG 16 WP 3 and ISO/IEC JTC 1/SC 29/WG 11, JVET-N0236, 14th Meeting: Geneva, CH, Mar. 19-27, 2019, (7p).

Semih Esenlik et al., BoG, "BoG report on PROF/BDOF harmonization contributions (CE4&CE9 related)", Joint Video Experts Team (JVET) of ITU-T SG 16 WP 3 and ISO/IEC JTC 1/SC 29/WG 11, JVET-O1133, 15th Meeting: Gothenburg, SE, Jul. 3-12, 2019, (13p).

* cited by examiner

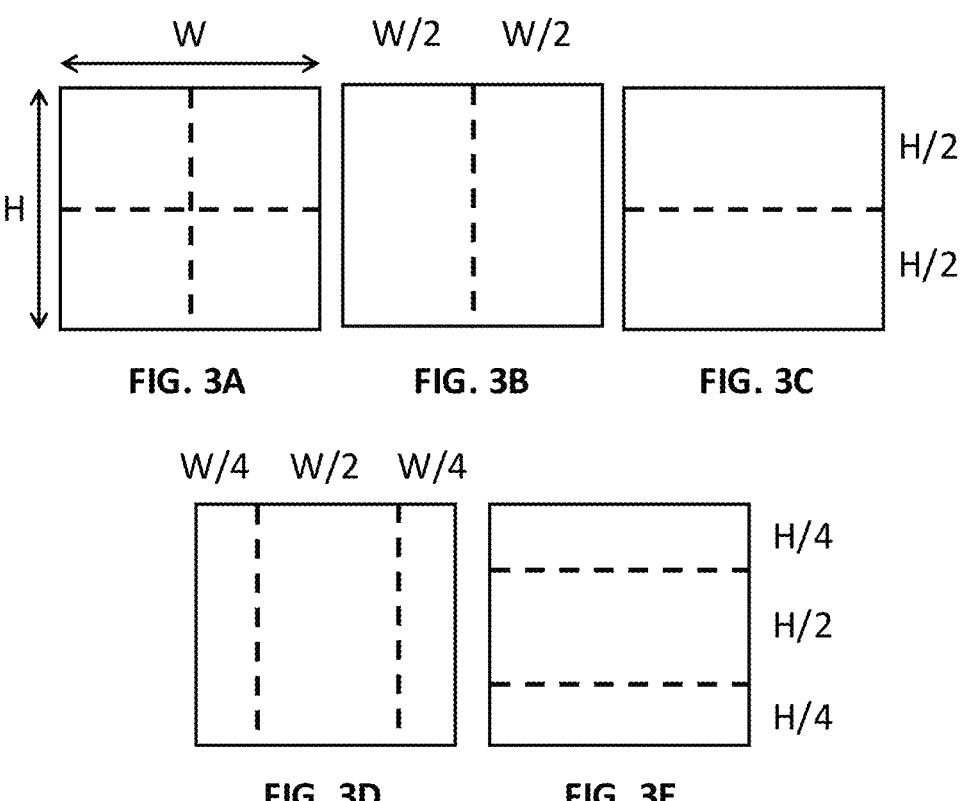
FIG. 3A      FIG. 3B      FIG. 3C
FIG. 3D      FIG. 3E
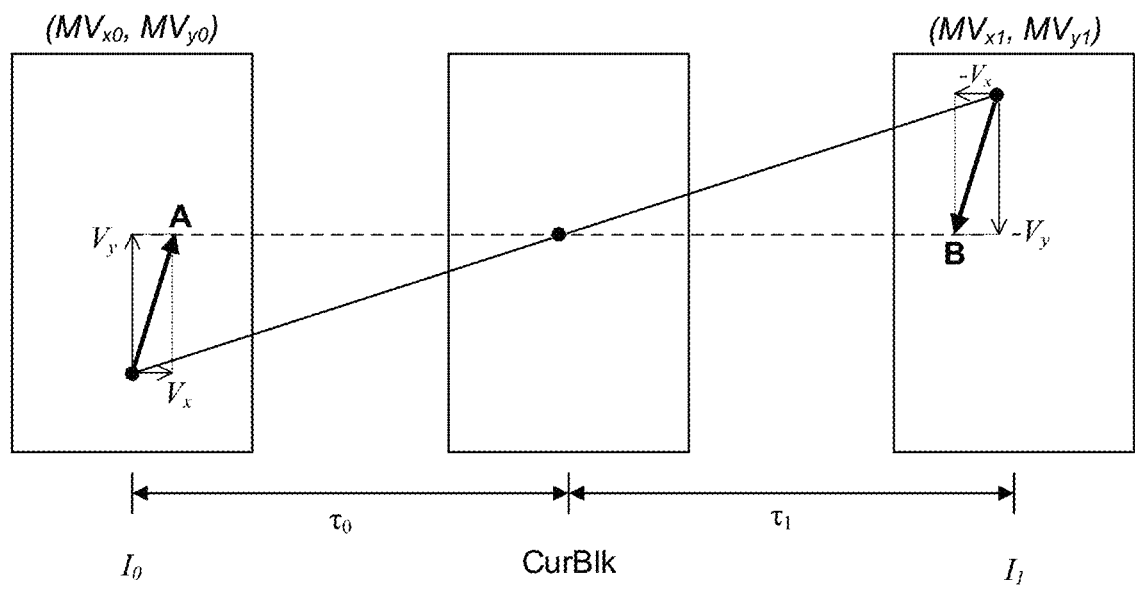
FIG. 4

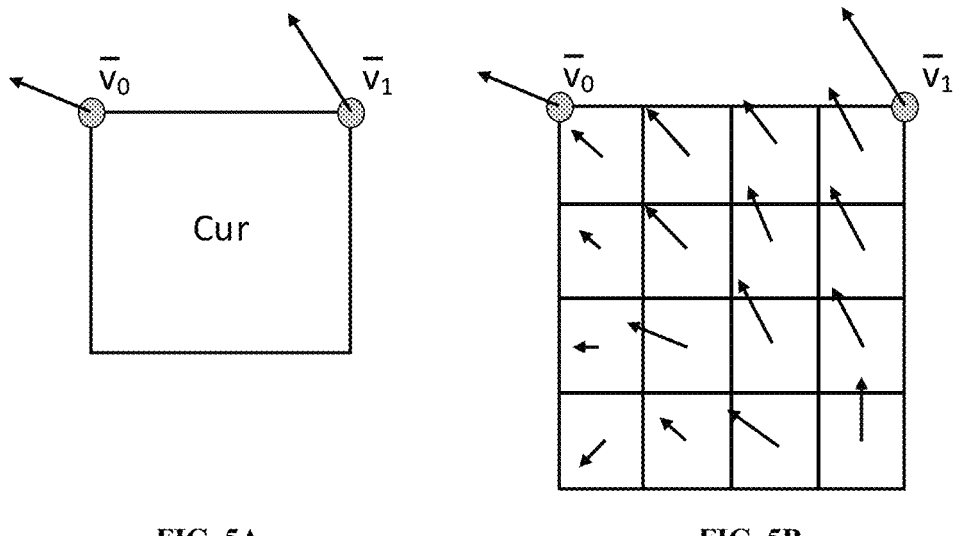
FIG. 5A                    FIG. 5B
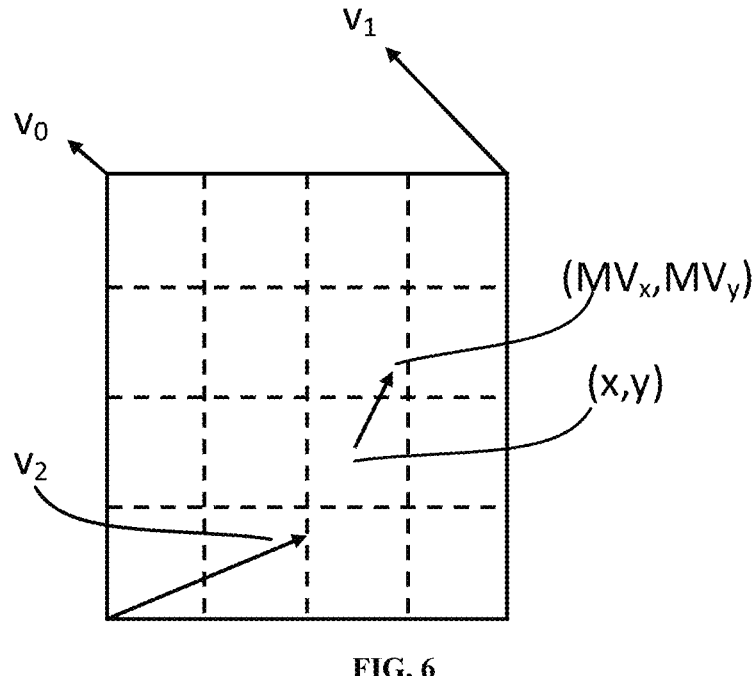
FIG. 6

900

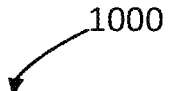

1000

Dividing a video block to multiple non-overlapped video subblocks, where at least one of the multiple non-overlapped video subblocks is associated with two motion vectors.          1010

Obtaining a first reference picture $I^{(0)}$ and a second reference picture $I^{(1)}$ associated with the two motion vectors of the at least one of the multiple non-overlapped video subblocks, where the first reference picture $I^{(0)}$ is before a current picture and the second reference picture $I^{(1)}$ is after the current picture in display order.          1012

Obtaining first prediction samples $I^{(0)}(i,j)$'s of the video subblock from a reference block in the first reference picture $I^{(0)}$, where i and j represent a coordinate of one sample with the current picture.          1014

Obtaining second prediction samples $I^{(1)}(i,j)$'s of the video subblock from a reference block in the second reference picture $I^{(1)}$.          1016

Obtaining horizontal and vertical gradient values of the first prediction samples $I^{(0)}(i,j)$'s and second prediction samples $I^{(1)}(i,j)$'s.          1018

Obtaining motion refinements for samples in the video subblock based on the BDOF when the video block is not coded in affine mode.          1020

Obtaining motion refinements for samples in the video subblock based on the PROF when the video block is coded in affine mode.          1022

Obtaining prediction samples of the video block based on the motion refinements.          1024

Figure 11:
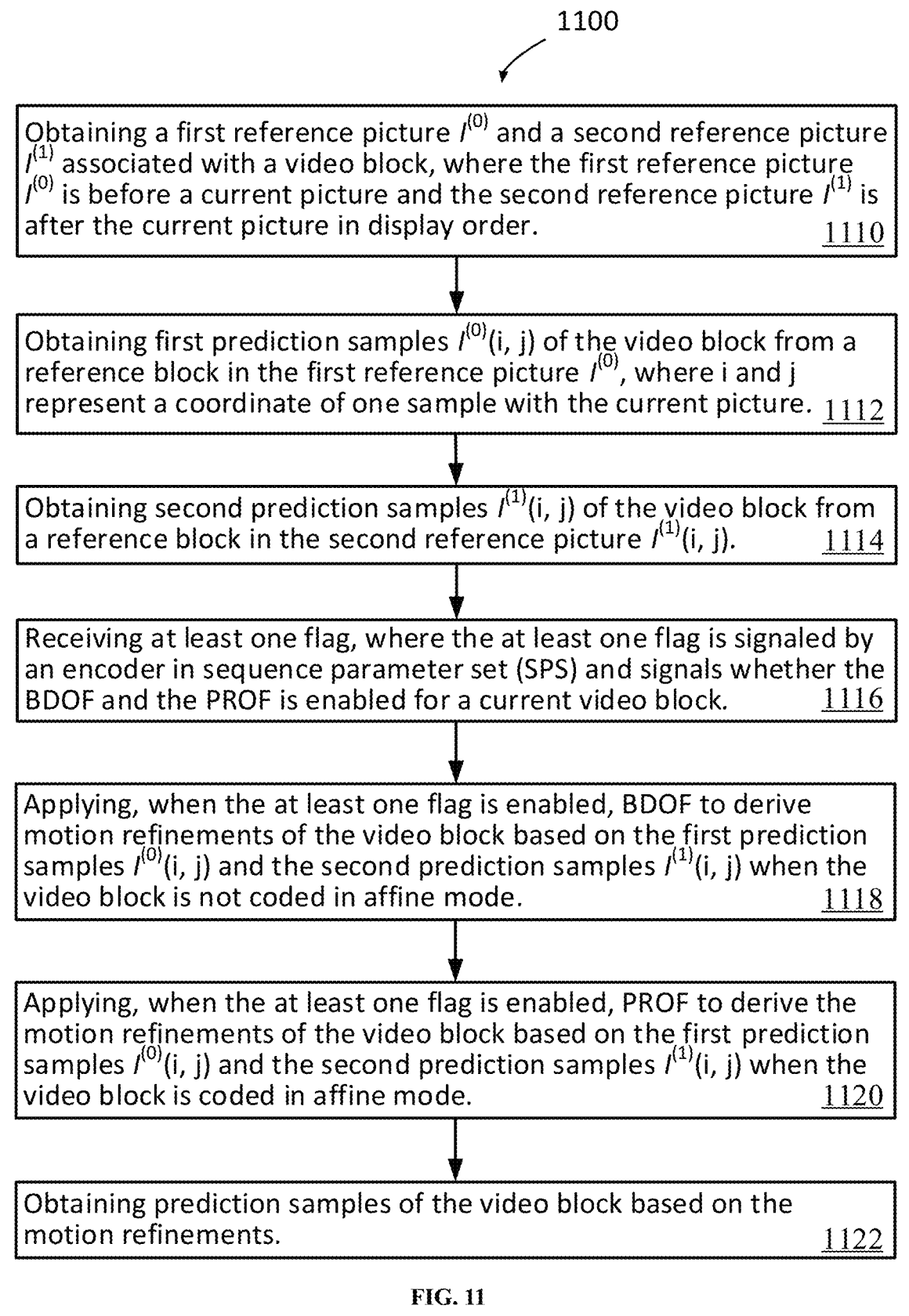

Obtaining a first reference picture $I^{(0)}$ and a second reference picture $I^{(1)}$ associated with a video block, where the first reference picture $I^{(0)}$ is before a current picture and the second reference picture $I^{(1)}$ is after the current picture in display order.          1110

Obtaining first prediction samples $I^{(0)}(i, j)$ of the video block from a reference block in the first reference picture $I^{(0)}$, where i and j represent a coordinate of one sample with the current picture. 1112

Obtaining second prediction samples $I^{(1)}(i, j)$ of the video block from a reference block in the second reference picture $I^{(1)}(i, j)$.          1114

Receiving at least one flag, where the at least one flag is signaled by an encoder in sequence parameter set (SPS) and signals whether the BDOF and the PROF is enabled for a current video block.          1116

Applying, when the at least one flag is enabled, BDOF to derive motion refinements of the video block based on the first prediction samples $I^{(0)}(i, j)$ and the second prediction samples $I^{(1)}(i, j)$ when the video block is not coded in affine mode.          1118

Applying, when the at least one flag is enabled, PROF to derive the motion refinements of the video block based on the first prediction samples $I^{(0)}(i, j)$ and the second prediction samples $I^{(1)}(i, j)$ when the video block is coded in affine mode.          1120

Obtaining prediction samples of the video block based on the motion refinements.          1122

---   4X4 subblock
        boundaries

☐  Padded
    samples

METHODS AND APPARATUS ON PREDICTION REFINEMENT WITH OPTICAL FLOW

CROSS-REFERENCE TO RELATED APPLICATIONS

This application is a continuation of U.S. application Ser. No. 17/571,434 filed on Jan. 7, 2022, which is a continuation application of PCT application No. PCT/US2020/041701 filed on Jul. 10, 2020, which is based upon and claims priority to Provisional Application No. 62/872,700 filed on Jul. 10, 2019, and Provisional Application No. 62/873,837 filed on Jul. 12, 2019, the disclosures of all of which are incorporated herein by reference in their entireties for all purposes.

TECHNICAL FIELD

This disclosure is related to video coding and compression. More specifically, this disclosure relates to methods and apparatus on the two inter prediction tools that are investigated in the versatile video coding (VVC) standard, namely, prediction refinement with optical flow (PROF) and bi-directional optical flow (BDOF).

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provide methods and apparatus for motion vector prediction in video coding.

According to a first aspect of the present disclosure, a unified method of bi-directional optical flow (BDOF) and prediction refinement with optical flow (PROF) for encoding a video signal is provided. The encoder may divide a video block to multiple non-overlapped video subblocks, where the at least one of the multiple non-overlapped video subblocks may be associated with two motion vectors. The encoder may determine a first reference picture $I^{(0)}$ and a second reference picture $I^{(1)}$ associated with the two motion vectors of the at least one of the multiple non-overlapped video subblocks. The first reference picture $I^{(0)}$ may be before a current picture and the second reference picture $I^{(1)}$ may be after the current picture in display order. The encoder may determine first prediction samples $I^{(0)}(i,j)$'s of video subblock from a reference block in the first reference picture $I^{(0)}$. The i and j may represent a coordinate of one sample with the current picture. The encoder may determine second prediction samples $I^{(1)}(i,j)$'s of the video subblock from a reference block in the second reference picture $I^{(1)}$. The encoder may determine horizontal and vertical gradient values of the first prediction samples $I^{(0)}(i,j)$'s and second prediction samples $I^{(1)}(i,j)$'s. The encoder may determine motion refinements for samples in the video subblock based on the BDOF when the video block is not coded in affine mode. The encoder may determine motion refinements for samples in the video subblock based on the PROF when the video block is coded in affine mode. The encoder may then determine prediction samples of the video block based on the motion refinements. The encoder may transmit, in a video bitstream, prediction related information associated with determined prediction samples.

According to a second aspect of the present disclosure, a method of BDOF and PROF for encoding a video signal is provided. The method may include determining, at a encoder, a first reference picture $I^{(0)}$ and a second reference picture $I^{(1)}$ associated with a video block. The first reference picture $I^{(0)}$ may be before a current picture and the second reference picture $I^{(1)}$ may be after the current picture in display order. The method may also include determining, at the encoder, first prediction samples $I^{(0)}(i,j)$ of the video block from a reference block in the first reference picture $I^{(0)}$. The i and j represent a coordinate of one sample with the current picture. The method may include determining, at the encoder, second prediction samples $I^{(1)}(i,j)$ of the video block from a reference block in the second reference picture $I^{(1)}$. The method may further include receiving, by the encoder, at least one flag. The at least one flag may be signaled by an encoder in sequence parameter set (SPS) and signals whether the BDOF and the PROF is enabled for a current video block. The method may include applying, at the encoder and when the at least one flag is enabled, BDOF to derive motion refinements of the video block based on the first prediction samples $I^{(0)}(i,j)$ and the second prediction samples $I^{(1)}(i,j)$ when the video block is not coded in affine mode. The method may additionally include applying, at the encoder and when the at least one flag is enabled, PROF to derive the motion refinements of the video block based on the first prediction samples $I^{(0)}(i,j)$ and the second prediction samples $I^{(1)}(i,j)$ when the video block is coded in affine mode. The method may also include determining, at the encoder, prediction samples of the video block based on the motion refinements. The method may also include transmitting, in a video bitstream, prediction related information associated with determined prediction samples.

According to a third aspect of the present disclosure, a computing device for encoding a video signal is provided. The computing device may include one or more processors, a non-transitory computer-readable memory storing instructions executable by the one or more processors. The one or more processors may be configured to divide a video block to multiple non-overlapped video subblocks. The at least one of the multiple non-overlapped video subblocks may be associated with two motion vectors. The one or more processors may further be configured to determine a first reference picture $I^{(0)}$ and a second reference picture $I^{(1)}$ associated with the two motion vectors of the at least one of the multiple non-overlapped video subblocks. The first reference picture $I^{(0)}$ may be before a current picture and the second reference picture $I^{(1)}$ may be after the current picture in display order. The one or more processors may further be configured to determine first prediction samples $I^{(0)}(i,j)$'s of video subblock from a reference block in the first reference picture $I^{(0)}$. The i and j represent a coordinate of one sample with the current picture. The one or more processors may further be configured to determine second prediction samples $I^{(1)}(i,j)$'s of the video subblock from a reference block in the second reference picture $I^{(1)}$. The one or more processors may further be configured to determine horizontal and vertical gradient values of the first prediction samples $I^{(0)}(i,j)$'s and second prediction samples $I^{(1)}(i,j)$'s. The one or more processors may further be configured to determine motion refinements for samples in the video subblock based on BDOF when the video block is not coded in affine mode. The one or more processors may further be configured to determine motion refinements for samples in the video subblock based on PROF when the video block is coded in affine mode. The one or more processors may further be configured to determine prediction samples of the video block based on the motion refinements. The one or more processors may further be configured to transmit, in a video bitstream, prediction related information associated with determined prediction samples.

According to a fourth aspect of the present disclosure, a non-transitory computer-readable storage medium having stored therein instructions is provided. When the instructions are executed by one or more processors of the apparatus, the instructions may cause the apparatus to perform determining, at a encoder, a first reference picture $I^{(0)}$ and a second reference picture $I^{(1)}$ associated with a video block. The first reference picture $I^{(0)}$ may be before a current picture and the second reference picture $I^{(1)}$ may be after the current picture in display order. The instructions may further cause the apparatus to perform determining, at the encoder, first prediction samples $I^{(0)}(i,j)$ of the video block from a reference block in the first reference picture $I^{(0)}$. The i and j represent a coordinate of one sample with the current picture. The instructions may further cause the apparatus to perform determining, at the encoder, second prediction samples $I^{(1)}(i,j)$ of the video block from a reference block in the second reference picture $I^{(1)}$. The instructions may further cause the apparatus to perform receiving, by the encoder, at least one flag. The at least one flag may be signaled by an encoder in SPS and signals whether BDOF and PROF are enabled for a current video block. The instructions may further cause the apparatus to perform applying, at the encoder and when the at least one flag is enabled, BDOF to derive motion refinements of the video block based on the first prediction samples $I^{(0)}(i,j)$ and the second prediction samples $I^{(1)}(i,j)$ when the video block is not coded in affine mode. The instructions may further cause the apparatus to perform applying, at the encoder and when the at least one flag is enabled, PROF to derive the motion refinements of the video block based on the first prediction samples $I^{(0)}(i,j)$ and the second prediction samples $I^{(1)}(i,j)$ when the video block is coded in affine mode. The instructions may further cause the apparatus to perform determining, at the encoder, prediction samples of the video block based on the motion refinements. The instructions may further cause the apparatus to perform transmitting, in a video bitstream, prediction related information associated with determined prediction samples.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 4 is a diagram illustration of a BDOF model according to an example of the present disclosure.

FIG. 5A is an illustration of an affine model, according to an example of the present disclosure.

FIG. 5B is an illustration of an affine model, according to an example of the present disclosure.

FIG. 6 is an illustration of an affine model, according to an example of the present disclosure.

FIG. 10 is a unified method of BDOF and PROF for decoding a video signal, according to an example of the present disclosure.

FIG. 11 is a method of BDOF and PROF for decoding a video signal, according to an example of the present disclosure.

DETAILED DESCRIPTION

Figure 1:
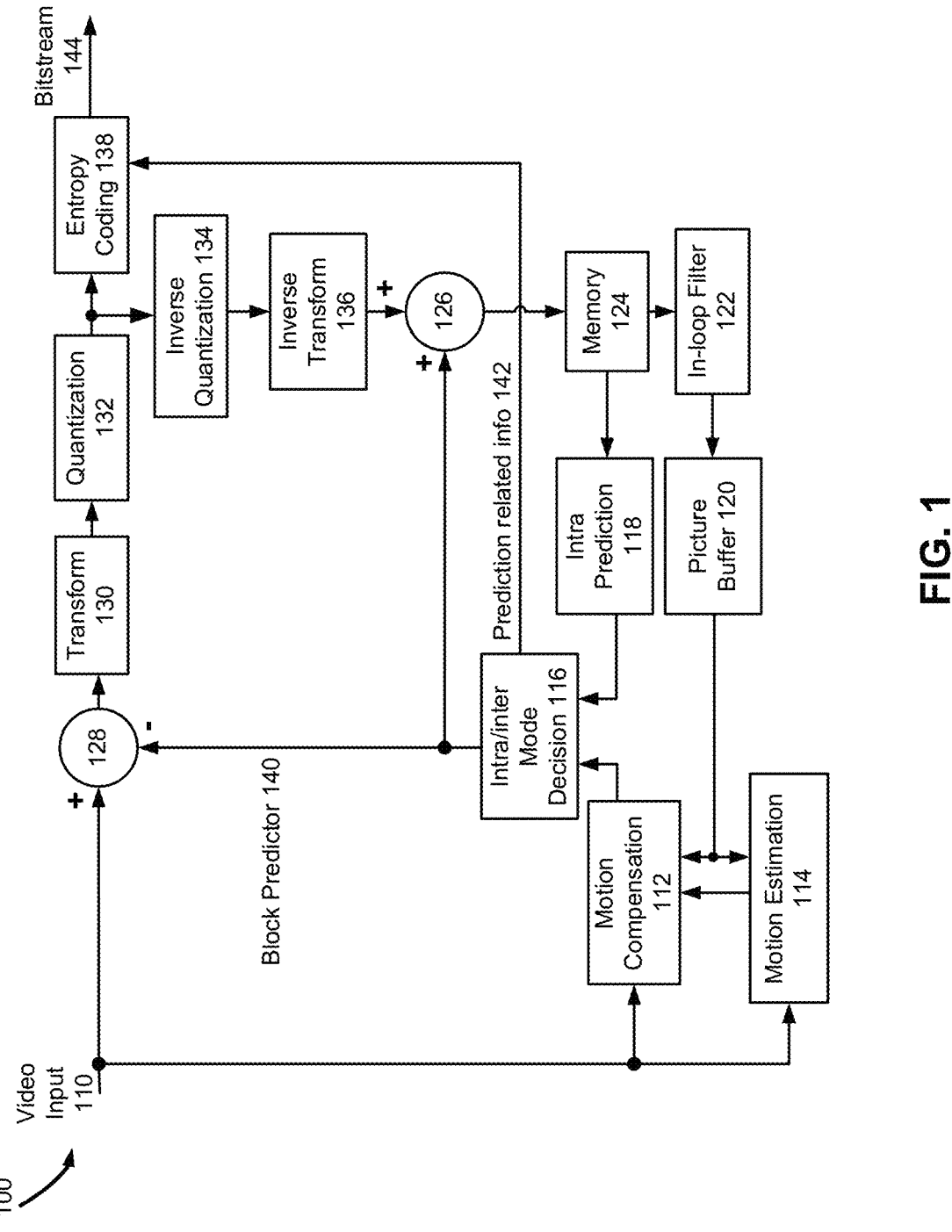
FIG. 1 is a block diagram of an encoder, according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment," depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. A Joint Video Exploration Team (JVET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called the VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs), which indicate the amount and the direction of motion between the current CU and its temporal reference. Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
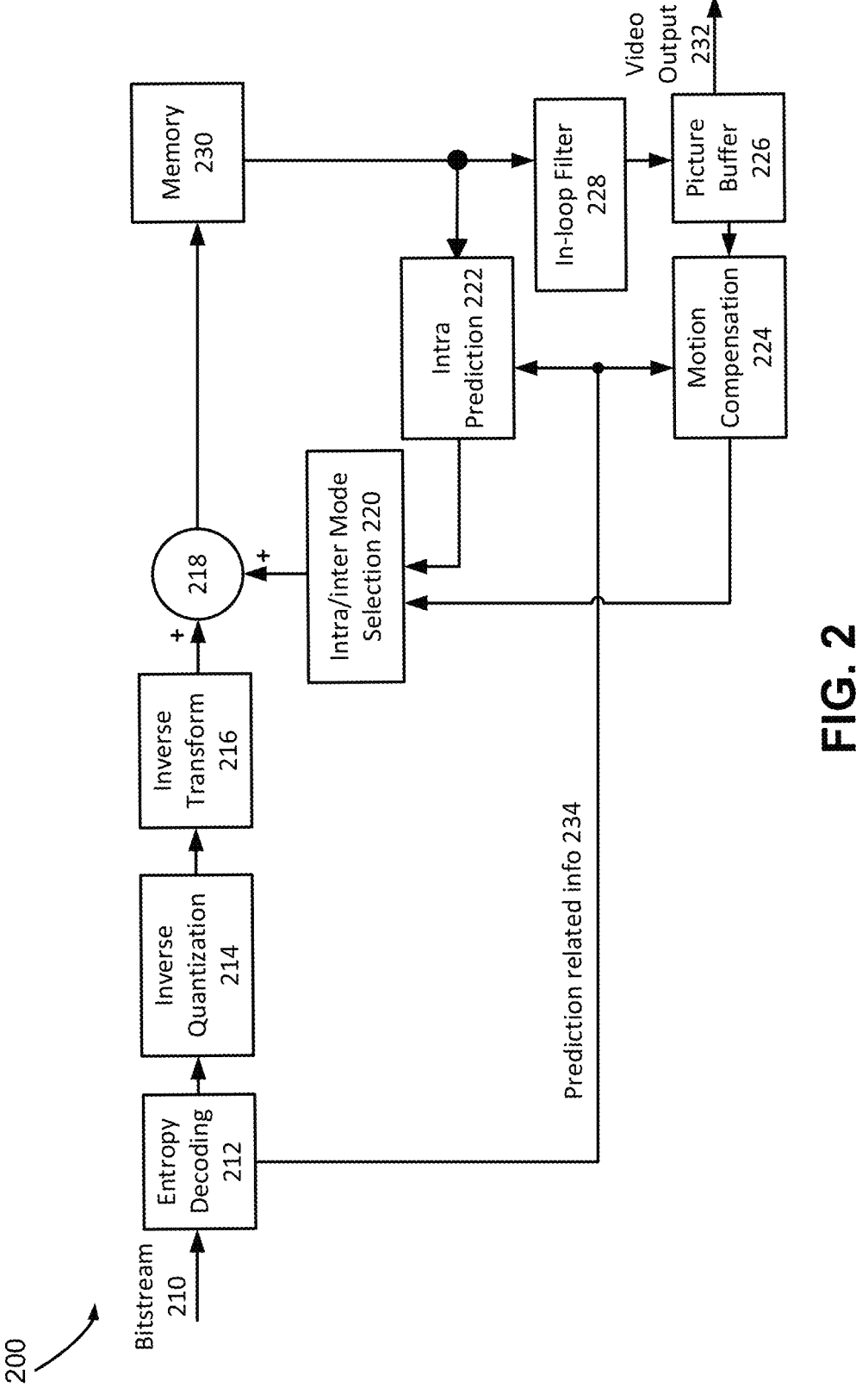
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic inter prediction techniques that are applied in the VVC are kept the same as that of the HEVC except that several modules are further extended and/or enhanced. In particular, for all the preceding video standards, one coding block can only be associated with one single MV when the coding block is uni-predicted or two MVs when the coding block is bi-predicted. Because of such limitation of the conventional block-based motion compensation, small motion can still remain within the prediction samples after motion compensation, therefore negatively affecting the overall efficiency of motion compensation. To improve both the granularity and precision of the MVs, two sample-wise refinement methods based on optical flow, namely bi-directional optical flow (BDOF) and prediction refinement with optical flow (PROF) for affine mode, are currently investigated for the VVC standard. In the following, the main technical aspects of the two inter coding tools are briefly reviewed.

Bi-Directional Optical Flow

In the VVC, BDOF is applied to refine the prediction samples of bi-predicted coding blocks. Specifically, as shown in FIG. 4, the BDOF is sample-wise motion refinement that is performed on top of the block-based motion-compensated predictions when bi-prediction is used.

FIG. 4 shows an illustration of a BDOF model, in accordance with the present disclosure.

The motion refinement $(v_x, v_y)$ of each 4×4 sub-block is calculated by minimizing the difference between L0 and L1 prediction samples after the BDOF is applied inside one 6×6 window $\Omega$ around the sub-block. Specifically, the value of $(v_x, v_y)$ is derived as $$v_x = S_1 > 0? \, clip3\left(-th_{BDOF}, th_{BDOF}, -\left((S_3 \cdot 2^3) \gg \lfloor \log_2 S_1 \rfloor\right)\right): 0 \quad (1)$$

$$v_y = S_5 > 0? \, clip3\left(-th_{BDOF}, th_{BDOF}, -\left((S_6 \cdot 2^3 - \right.\right.$$

$$\left.\left. ((v_x S_{2,m}) \ll n_{S_2} + v_x S_{2s})/2) \gg \lfloor \log_2 S_5 \rfloor\right)\right): 0$$

where $\lfloor \cdot \rfloor$ is the floor function; clip3(min, max, x) is a function that clips a given value x inside the range of [min, max]; the symbol $\gg$ represents bitwise right shift operation; the symbol $\ll$ represents bitwise left shift operation; $th_{BDOF}$ is the motion refinement threshold to prevent the propagated errors due to irregular local motion, which is equal to $1 \ll \max(5, \text{bit-depth-7})$., where bit-depth is the internal bit-depth. In (1), $S_{2,m} = S_2 \gg n_{S_2}$, $S_{2,s} = S_2 \& (2^{n_{S_2}} - 1)$.

The values of $S_1$, $S_2$, $S_3$, $S_5$ and $S_6$ are calculated as $$S_1 = \sum_{(i,j) \in \Omega} \psi_x(i,j) \cdot \psi_x(i,j), \, S_3 = \sum_{(i,j) \in \Omega} \theta(i,j) \cdot \psi_x(i,j) \quad (2)$$

$$S_2 = \sum_{(i,j) \in \Omega} \psi_x(i,j) \cdot \psi_y(i,j)$$

$$S_5 = \sum_{(i,j) \in \Omega} \psi_y(i,j) \cdot \psi_y(i,j) \, S_6 = \sum_{(i,j) \in \Omega} \theta(i,j) \cdot \psi_y(i,j)$$

$$\text{where } \psi_x(i,j) = \left(\frac{\partial I^{(1)}}{\partial x}(i,j) + \frac{\partial I^{(0)}}{\partial x}(i,j)\right) \gg \max(1, \text{bit-depth} - 11)$$

$$\psi_y(i,j) = \left(\frac{\partial I^{(1)}}{\partial y}(i,j) + \frac{\partial I^{(0)}}{\partial y}(i,j)\right) \gg \max(1, \text{bit-depth} - 11)$$

$$\theta(i,j) =$$

$$\left(I^{(1)}(i,j) \gg \max(4, \text{bit-depth} - 8)\right) - \left(I^{(0)}(i,j) \gg \max(4, \text{bit-depth} - 8)\right)$$

where $I^{(k)}(i,j)$ are the sample value at coordinate (i,j) of the prediction signal in list k, k=0,1, which are generated at intermediate high precision (i.e., 16-bit);

$$\frac{\partial I^{(k)}}{\partial x}(i,j) \text{ and } \frac{\partial I^{(k)}}{\partial y}(i,j)$$

are the horizontal and vertical gradients of the sample that are obtained by directly calculating the difference between its two neighboring samples, i.e., $$\frac{\partial I^{(k)}}{\partial x}(i,j) = \left(I^{(k)}(i+1,j) - I^{(k)}(i-1,j)\right) \gg \max(6, \text{bit-depth} - 6) \quad (4)$$

$$\frac{\partial I^{(k)}}{\partial y}(i,j) = \left(I^{(k)}(i,j+1) - I^{(k)}(i,j-1)\right) \gg \max(6, \text{bit-depth} - 6)$$

Based on the motion refinement derived in (1), the final bi-prediction samples of the CU are calculated by interpolating the L0/L1 prediction samples along the motion trajectory based on the optical flow model, as indicated by $$pred_{BDOF}(x,y) = \left(I^{(0)}(x,y) + I^{(1)}(x,y) + b + o_{offset}\right) \gg \text{shift} \quad (5)$$

$$b = rnd\left(\left(v_x\left(\frac{\partial I^{(1)}(x,y)}{\partial x} - \frac{\partial I^{(0)}(x,y)}{\partial x}\right)\right)/2\right) +$$

$$rnd\left(\left(v_y\left(\frac{\partial I^{(1)}(x,y)}{\partial y} - \frac{\partial I^{(0)}(x,y)}{\partial y}\right)\right)/2\right)$$

where shift and $o_{offset}$ are the right shift value and the offset value that are applied to combine the L0 and L1 prediction signals for bi-prediction, which are equal to 15–bit-depth and $1 \ll (14-\text{bit-depth}) + 2 \cdot (1 \ll 13)$, respectively. Based on the above bit-depth control method, it is guaranteed that the maximum bit-depth of the intermediate parameters of the whole BDOF process do not exceed 32-bit and the largest input to the multiplication is within 15-bit, i.e., one 15-bit multiplier is sufficient for BDOF implementations.

Affine Mode

In HEVC, only translation motion model is applied for motion compensated prediction. While in the real world, there are many kinds of motion, e.g., zoom in/out, rotation, perspective motions, and other irregular motions. In the VVC, affine motion compensated prediction is applied by signaling one flag for each inter coding block to indicate whether the translation motion or the affine motion model is applied for inter prediction. In the current VVC design, two affine modes, including 4-parameter affine mode and 6-parameter affine mode, are supported for one affine coding block.

The 4-parameter affine model has the following parameters: two parameters for translation movement in horizontal and vertical directions, respectively, one parameter for zoom motion and one parameter for rotation motion for both directions. Horizontal zoom parameter is equal to vertical zoom parameter. Horizontal rotation parameter is equal to vertical rotation parameter. To achieve a better accommodation of the motion vectors and affine parameter, in the VVC, those affine parameters are translated into two MVs (which are also called control point motion vector (CPMV)) located at the top-left corner and top-right corner of a current block. As shown in FIGS. 5A and 5B, the affine motion field of the block is described by two control point MVs $(V_0, V_1)$.

FIG. 5A shows an illustration of a 4-parameter affine model, in accordance with the present disclosure.

FIG. 5B shows an illustration of a 4-parameter affine model, in accordance with the present disclosure.

Based on the control point motion, the motion field ($v_x$, $v_y$) of one affine coded block is described as $$v_x = \frac{(v_{1x} - v_{0x})}{w}x - \frac{(v_{1y} - v_{0y})}{w}y + v_{0x} \tag{6}$$

$$v_y = \frac{(v_{1y} - v_{0y})}{w}x + \frac{(v_{1x} - v_{0x})}{w}y + v_{0y}$$

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs.

FIG. 6 shows an illustration of a 6-parameter affine model, in accordance with the present disclosure.

As shown in FIG. 6, three control points of one 6-parameter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-parameter may not be same as those motion in vertical direction. Assuming ($V_0$, $V_1$, $V_2$) are the MVs of the top-left, top-right and bottom-left corners of the current block in FIG. 6, the motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h} \tag{7}$$

$$v_y = v_{0y} + (v_{1y} - v_{0y}) * \frac{x}{w} + (v_{2y} - v_{0y}) * \frac{y}{h}$$

Prediction Refinement With Optical Flow for Affine Mode

To improve affine motion compensation precision, the PROF is currently investigated in the current VVC, which refines the sub-block based affine motion compensation based on the optical flow model. Specifically, after performing the sub-block-based affine motion compensation, luma prediction sample of one affine block is modified by one sample refinement value derived based on the optical flow equation. In details, the operations of the PROF can be summarized as the following four steps:

Step one: The sub-block-based affine motion compensation is performed to generate sub-block prediction I(i,j) using the sub-block MVs as derived in (6) for 4-parameter affine model and (7) for 6-parameter affine model.

Step two: The spatial gradients $g_x$(i,j) and $g_y$(i,j) of each prediction samples are calculated as $$g_x(i, j) = (I(i + 1, j) - I(i - 1, j)) \gg (\max(2, 14 - \text{bit-depth}) - 4) \tag{8}$$

$$g_y(i, j) = (I(i, j + 1) - I(i, j - 1)) \gg (\max(2, 14 - \text{bit-depth}) - 4)$$

To calculate the gradients, one additional row/column of prediction samples need to be generated on each side of one sub-block. To reduce the memory bandwidth and complexity, the samples on the extended borders are copied from the nearest integer pixel position in the reference picture to avoid additional interpolation processes.

Step three: The luma prediction refinement value is calculated by $$\Delta I(i, j) = g_x(i, j) * \Delta v_x(i, j) + g_y(i, j) * \Delta v_y(i, j) \tag{9}$$

where the $\Delta v(i,j)$ is the difference between pixel MV computed for sample location (i,j), denoted by v(i,j), and the sub-block MV of the sub-block where the pixel (i,j) locates at. Additionally, in the current PROF design, after adding the prediction refinement to the original prediction sample, one clipping operation is performed to clip the value of the refined prediction sample to be within 15-bit, i.e., $$I'(i, j) = I(i, j) + \Delta I(i, j)$$

$$I'(i, j) = clip3(-2^{14}, 2^{14} - 1, I'(i, j))$$

where I(i,j) and I'(i,j) are the original and refined prediction sample at location (i,j), respectively.

Figure 7:
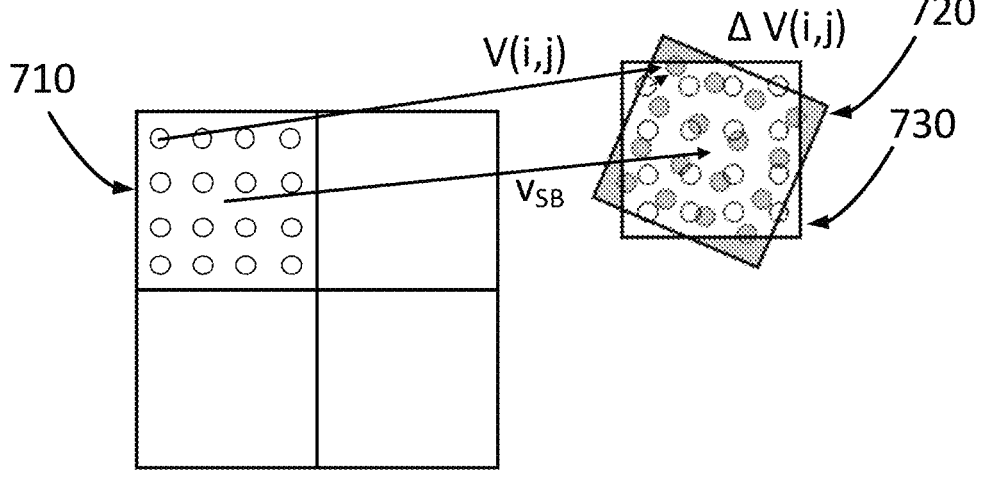
FIG. 7 is an illustration of a PROF according to an example of the present disclosure.

FIG. 7 illustrates the PROF process for the affine mode, in accordance with the present disclosure.

Because the affine model parameters and the pixel location relative to the sub-block center are not changed from sub-block to sub-block, $\Delta v(i,j)$ can be calculated for the first sub-block, and reused for other sub-blocks in the same CU. Let $\Delta x$ and $\Delta y$ be the horizontal and vertical offset from the sample location (i,j) to the center of the sub-block that the sample belongs to, $\Delta v(i,j)$ can be derived as $$\Delta v_x(i, j) = c * \Delta x + d * \Delta y \tag{10}$$

$$\Delta v_y(i, j) = e * \Delta x + f * \Delta y$$

Based on the affine sub-block MV derivation equations (6) and (7), the MV difference $\Delta v(i,j)$ can be derived. Specifically, for 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where ($v_{0x}$, $v_{0y}$), ($v_{1x}$, $v_{1y}$), ($v_{2x}$, $v_{2y}$) are the top-left, top-right and bottom-left control point MVs of the current coding block, w and h are the width and height of the block. In the existing PROF design, the MV difference $\Delta v_x$ and $\Delta v_y$ are always derived at the precision of ⅓2-pel.

Local Illumination Compensation

Local illumination compensation (LIC) is a coding tool which is used to address the issue of local illumination changes that exist in-between temporal neighboring pictures. A pair of weight and offset parameters is applied to the reference samples to obtain the prediction samples of one current block. The general mathematical model is given as $$P[x] = \alpha * P_r[x+v] + \beta \tag{11}$$

where $P_r[x+v]$ is the reference block indicated by the motion vector v, [α, β] is the corresponding pair of weight and offset parameters for the reference block and P[x] is the final prediction block. The pair of the weight and offset parameters is estimated using least linear mean square error (LLMSE) algorithm based on the template (i.e., neighboring reconstructed samples) of the current block and the reference block of the template (which is derived using the motion vector of the current block). By minimizing the mean square difference between the template samples and the reference samples of the template, the mathematical representation of α and β can be derived as follows $$\alpha = \frac{I \cdot \Sigma_{i=1}^{I}(P_c[x_i] \cdot P_r[x_i]) - \Sigma_{i=1}^{I}(P_c[x_i]) \cdot \Sigma_{i=1}^{I}(P_r[x_i])}{I \cdot \Sigma_{i=1}^{I}(P_r[x_i] \cdot P_r[x_i]) - (\Sigma_{i=1}^{I}P_r[x_i])^2} \tag{12}$$

$$\beta = \frac{\Sigma_{i=1}^{I}(P_c[x_i]) - \alpha \cdot \Sigma_{i=1}^{I}(P_r[x_i])}{I}$$

where I represent the number of samples in the template. $P_c[x_i]$ is the i-th sample of the current block's template and $P_r[x_i]$ is the reference sample of the i-th template sample based on the motion vector v.

Figure 16A:
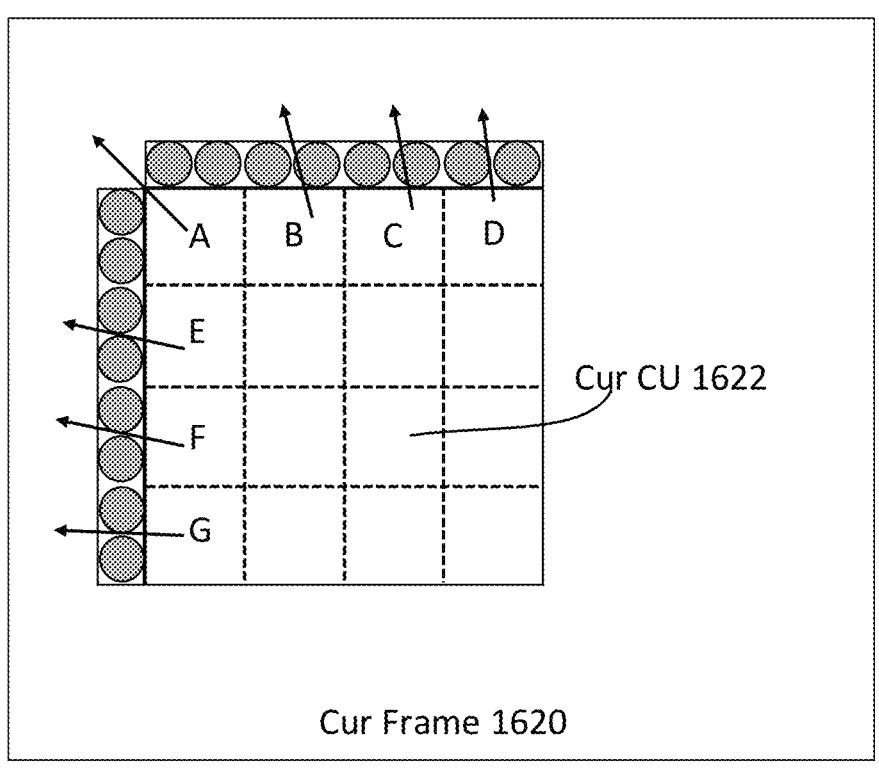
FIG. 16A is an illustration of deriving template samples for affine mode, according to an example of the present disclosure.
Figure 16B:
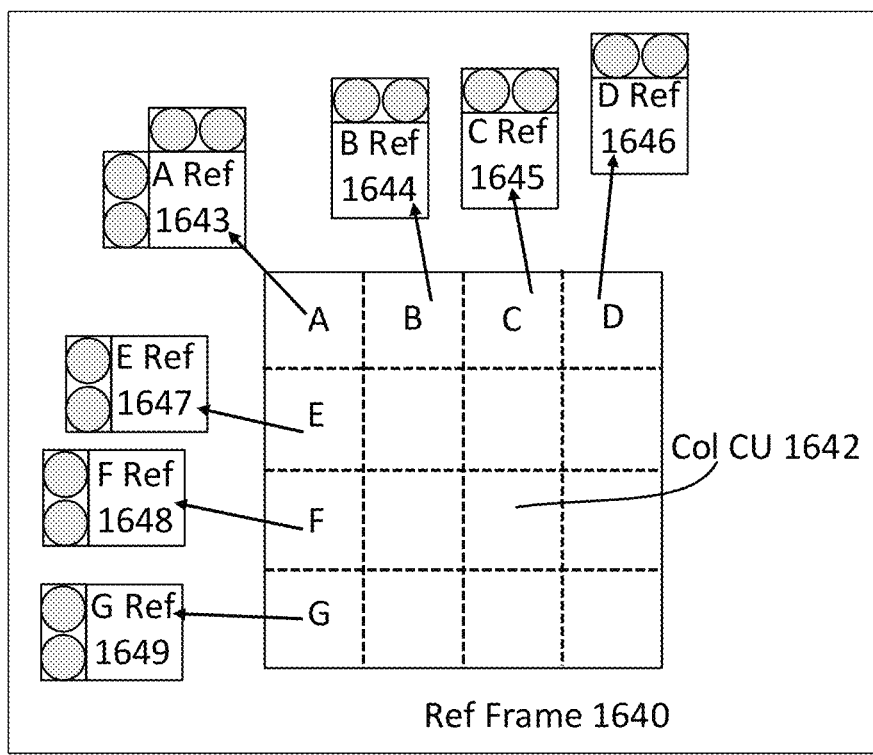
FIG. 16B is an illustration of deriving template samples for affine mode, according to an example of the present disclosure.

In addition to being applied to regular inter blocks which at most contain one motion vector for each prediction direction (L0 or L1), LIC is also applied to affine mode coded blocks where one coding block is further split into multiple smaller subblocks and each subblock may be associated with different motion information. To derive the reference samples for the LIC of an affine mode coded block, as shown in FIGS. 16A and 16B, the reference samples in the top template of one affine coding block are fetched using the motion vector of each subblock in the top subblock row while the reference samples in the left template are fetched using the motion vectors of the subblocks in the left subblock column. After that, the same LLMSE derivation method as shown in (12) is applied to derive the LIC parameters based on the composite template.

FIG. 16A shows an illustration for deriving template samples for an affine mode, in accordance with the present disclosure. The illustration contains Cur Frame 1620 and Cur CU 1622. Cur Frame 1620 is the current frame. Cur CU 1622 is the current coding unit.

FIG. 16B shows an illustration for deriving template samples for an affine mode. The illustration contains Ref Frame 1640, Col CU 1642, A Ref 1643, B Ref 1644, C Ref 1645, D Ref 164,6 E Ref 1647, F Ref 1648, and G Ref 1649. Ref Frame 1640 is the reference frame. Col CU 1642 is the collocated coding unit. A Ref 1643, B Ref 1644, C Ref 1645, D Ref 164,6 E Ref 1647, F Ref 1648, and G Ref 1649 are reference samples.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may be understood to mean "when" or "upon" or "in response to" depending on the context.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

Current BDOF, PROF, and LIC Design

Although the PROF can enhance the coding efficiency of affine mode, its design can still be further improved. Especially, given the fact that both PROF and BDOF are built upon the optical flow concept, it is highly desirable to harmonize the designs of the PROF and the BDOF as much as possible such that the PROF can maximally leverage the existing logics of the BDOF to facilitate hardware implementations. Based on such consideration, the following inefficiencies on the interaction between the current PROF and BDOF designs are identified in this disclosure.

As described in the section "prediction refinement with optical flow for affine mode," in equation (8), the precision of gradients is determined based on the internal bit-depth. On the other hand, the MV difference, i.e., $\Delta v_x$ and $\Delta v_y$, are always derived at the precision of ⅓2-pel. Correspondingly, based on the equation (9), the precision of the derived PROF refinement is dependent on the internal bit-depth. However, similar to the BDOF, the PROF is applied on top of the prediction sample values at intermediate high bit-depth (i.e., 16-bit) in order to keep higher PROF derivation precision. Therefore, regardless of the internal coding bit-depth, the precision of the prediction refinements derived by the PROF should match that of the intermediate prediction samples, i.e., 16-bit. In other words, the representation bit-depths of the MV difference and gradients in the existing PROF design are not perfectly matched to derive accurate prediction refinements relative to the prediction sample precision (i.e., 16-bit). Meanwhile, based on the comparison of equations (1), (4) and (8), the existing PROF and BDOF use different precisions to represent the sample gradients and the MV difference. As pointed out earlier, such non-unified design is undesirable for hardware because the existing BDOF logic cannot be reused.

Figure 8:
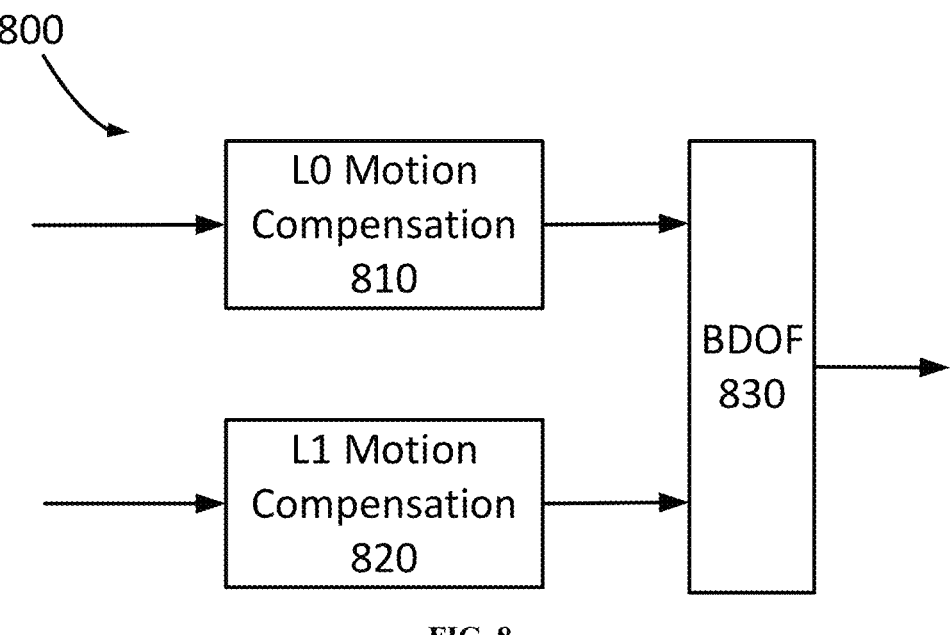
FIG. 8 is a workflow of a BDOF, according to an example of the present disclosure.
Figure 9:
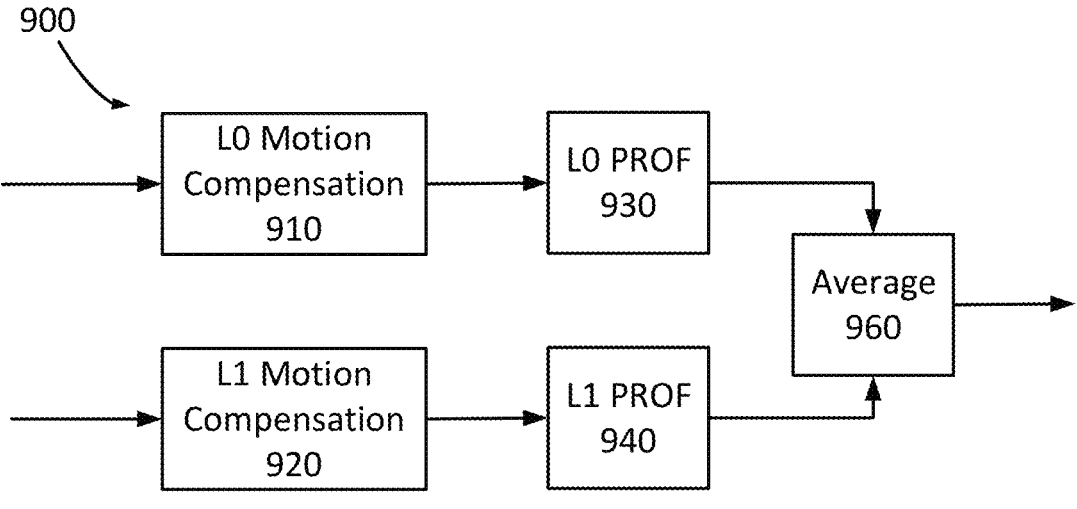
FIG. 9 is a workflow of a PROF, according to an example of the present disclosure.

As discussed in the section "prediction refinement with optical flow for affine mode," when one current affine block is bi-predicted, the PROF is applied to the prediction samples in list L0 and L1 separately; then, the enhanced L0 and L1 prediction signals are averaged to generate the final bi-prediction signal. On the contrary, instead of separately deriving the PROF refinement for each prediction direction, the BDOF derives the prediction refinement once, which is then applied to enhance the combined L0 and L1 prediction signal. FIGS. 8 and 9 (described below) compare the work-flow of the current BDOF and the PROF for bi-prediction. In practical codec hardware pipeline design, it usually assigns different major encoding/decoding modules to each pipeline stage such that more coding blocks can be pro-cessed in parallel. However, due to the difference between the BDOF and PROF workflows, this may lead to difficulty to have one same pipeline design that can be shared by the BDOF and the PROF, which is unfriendly for practical codec implementation.

FIG. 8 shows the workflow of a BDOF, in accordance with the present disclosure. Workflow 800 includes L0 motion compensation 810, L1 motion compensation 820, and BDOF 830. L0 motion compensation 810, for example, can be a list of motion compensation samples from a previous reference picture. The previous reference picture is a reference picture previous from the current picture in the video block. L1 motion compensation 820, for example, can be a list of motion compensation samples from the next reference picture. The next reference picture is a reference picture after the current picture in the video block. BDOF 830 intakes motion compensation samples from L1 Motion Compensation 810 and L1 Motion Compensation 820 and output prediction samples, as described with regards to FIG. 4 above.

FIG. 9 shows a workflow of an existing PROF, in accor-dance with the present disclosure. Workflow 900 includes L0 motion compensation 910, L1 motion compensation 920, L0 PROF 930, L1 PROF 940, and average 960. L0 motion compensation 910, for example, can be a list of motion compensation samples from a previous reference picture. The previous reference picture is a reference picture previ-ous from the current picture in the video block. L1 motion compensation 920, for example, can be a list of motion compensation samples from the next reference picture. The next reference picture is a reference picture after the current picture in the video block. L0 PROF 930 intakes the L0 motion compensation samples from L0 Motion Compensa-tion 910 and outputs motion refinement values, as described with regards to FIG. 7 above. L1 PROF 940 intakes the L1 motion compensation samples from L1 Motion Compensa-tion 920 and outputs motion refinement values, as described with regards to FIG. 7 above. Average 960 averages the motion refinement value outputs of L0 PROF 930 and L1 PROF 940.

1) For both the BDOF and the PROF, the gradients need to be calculated for each sample inside the current coding block, which requires generating one additional row/column of prediction samples on each side of the block. To avoid the additional computational complex-ity of sample interpolation, the prediction samples in the extended region around the block are directly copied from the reference samples at integer position (i.e., without interpolation). However, according to the existing design, the integer samples at different loca-tions are selected to generate the gradient values of the BDOF and the PROF. Specifically, for the BDOF, the integer reference sample that is located left to the prediction sample (for horizontal gradients) and above the prediction sample (for vertical gradients) are used; for the PROF, the integer reference sample that is closest to the prediction sample is used for gradient calculations. Similar to the bit-depth representation problem, such non-unified gradient calculation method is also undesirable for hardware codec implementa-tions.

2) As pointed out earlier, the motivation of the PROF is to compensate the small MV difference between the MV of each sample and the subblock MV that is derived at the center of the subblock that the sample belongs to. According to the current PROF design, the PROF is always invoked when one coding block is predicted by the affine mode. However, as indicated in equation (6) and (7), the subblock MVs of one affine block is derived from the control-point MVs. There-fore, when the difference between the control-point MVs are relatively small, the MVs at each sample position should be consistent. In such case, because the benefit of applying the PROF could be very limited, it may not worth to do the PROF when considering the performance/complexity tradeoff.

Improvements to BDOF, PROF, and LIC

In this disclosure, methods are provided to improve and simplify the existing PROF design to facilitate hardware codec implementations. Particularly, special attention is made to harmonize the designs of the BDOF and the PROF in order to maximally share the existing BDOF logics with the PROF. In general, the main aspects of the proposed technologies in this disclosure are summarized as follows.

1) To improve the coding efficiency of the PROF while achieving one more unified design, one method is proposed to unify the representation bit-depth of the sample gradients and the MV difference that are used by the BDOF and the PROF.

2) To facilitate hardware pipeline design, it is proposed to harmonize the workflow of the PROF with that of the BDOF for bi-prediction. Specifically, unlike the exist-ing PROF that derives the prediction refinements sepa-rately for L0 and L1, the proposed method derives the prediction refinement once which is applied to the combined L0 and L1 prediction signal.

3) Two methods are proposed to harmonize the derivation of the integer reference samples to calculate the gradi-ent values that are used by the BDOF and the PROF.

4) To reduce the computational complexity, early termi-nation methods are proposed to adaptively disable the PROF process for affine coding blocks when certain conditions are satisfied.

Improved Bit-Depth Representation Design of PROF Gra-dients and MV Difference

As analyzed in Section "problem statement", the repre-sentation bit-depths of the MV difference and the sample gradients in the current PROF are not aligned to derive accurate prediction refinements. Moreover, the representa-tion bit-depth of the sample gradients and the MV difference are inconsistent between the BDOF and the PROF, which is unfriendly for hardware. In this section, one improved bit-depth representation method is proposed by extending the bit-depth representation method of the BDOF to the PROF. Specifically, in the proposed method, the horizontal and vertical gradients at each sample position are calculated as $$g_x(i, j) = (I(i + 1, j) - I(i - 1, j)) \gg \max(6, \text{bit-depth} - 6) \qquad (13)$$

$$g_y(i, j) = (I(i, j + 1) - I(i, j - 1)) \gg \max(6, \text{bit-depth} - 6)$$

Additionally, assuming $\Delta x$ and $\Delta y$ be the horizontal and vertical offset represented at $\frac{1}{4}$-pel accuracy from one sample location to the center of the sub-block that the sample belongs to, the corresponding PROF MV difference $\Delta v(x, y)$ at the sample position is derived as $$\Delta v_x(i, j) = (c * \Delta x + d * \Delta y) \gg (13 - dMvBits) \qquad (14)$$

$$\Delta v_y(i, j) = (e * \Delta x + f * \Delta y) \gg (13 - dMvBits)$$

where dMvBits is the bit-depth of the gradient values that are used by the BDOF process, i.e., dMvBits=max(5, (bit-depth−7))+1. In equation (13) and (14), c, d, e and f are affine parameters which are derived based on the affine control-point MVs. Specifically, for 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right, and bottom-left control point MVs of the current coding block, which are represented in $\frac{1}{16}$-pel precision, and w and h are the width and height of the block.

In the above discussion, as shown in equation (13) and (14), a pair of fixed right shifts are applied to calculate the values of the gradients and the MV differences. In practice, different bit-wise right shifts may be applied to (13) and (14) achieve various representation precisions of the gradients and the MV difference for different trade-off between intermediate computational precision and the bit-width of the internal PROF derivation process. For example, when the input video contains a lot of noise, the derived gradients may be not reliable to represent the true local horizontal/vertical gradient values at each sample. In such case, it makes more sense to use more bits to represent the MV differences than the gradients. On the other, when the input video shows steady motion, the MV differences as derived by the affine model should be very small. If so, using high precision MV difference cannot provide additional benefit to increase the precision of the derived PROF refinement. In other words, in such case, it is more beneficial to use more bits to represent gradient values. Based on the above consideration, in one embodiment of the disclosure, one general method in proposed in the following to calculate the gradients and the MV difference for the PROF. Specifically, assuming the horizontal and vertical gradients at each sample position are calculated by applying $n_a$ right shifts to the difference of the neighboring prediction samples, i.e., $$g_x(i, j) = (I(i + 1, j) - I(i - 1, j)) \gg n_a \qquad (15)$$

$$g_y(i, j) = (I(i, j + 1) - I(i, j - 1)) \gg n_a$$

the corresponding PROF MV difference $\Delta v(x, y)$ at the sample position should be calculated as $$\Delta v_x(i, j) = (c * \Delta x + d * \Delta y) \gg (13 - n_a) \qquad (16)$$

$$\Delta v_y(i, j) = (e * \Delta x + f * \Delta y) \gg (13 - n_a)$$

where $\Delta x$ and $\Delta y$ be the horizontal and vertical offset represented at $\frac{1}{4}$-pel accuracy from one sample location to the center of the sub-block that the sample belongs and c, d, e, and f are affine parameters which are derived based on $\frac{1}{16}$-pel affine control-point MVs. Finally, the final PROF refinement of the sample is calculated as $$\Delta I(i, j) = (g_x(i, j) * \Delta v_x(i, j) + g_y(i, j) * \Delta v_y(i, j) + 1) \gg 1 \qquad (17)$$

In another embodiment of the disclosure, another PROF bit-depth control method is proposed as follows. In the method, the horizontal and vertical gradients at each sample position are still calculated as in (18) by applying $n_a$ bit of right shifts to the difference value of the neighboring prediction samples. The corresponding PROF MV difference $\Delta v(x, y)$ at the sample position should be calculated as:

$$\Delta v_x(i, j) = (c * \Delta x + d * \Delta y) \gg (14 - n_a)$$

$$\Delta v_y(i, j) = (e * \Delta x + f * \Delta y) \gg (14 - n_a)$$

Additionally, in order to keep the whole PROF derivation at appropriate internal bit-depth, clipping is applied to the derived MV difference as follows:

$$\Delta v_x(i, j) = \text{Clip3}(-\text{limit, limit}, \Delta v_x(i, j))$$

$$\Delta v_y(i, j) = \text{Clip3}(-\text{limit, limit}, \Delta v_y(i, j))$$

where limit is the threshold which is equal to $2^{n_b}$ and clip3(min, max, x) is a function that clips a given value x inside the range of [min, max]. In one example, the value of $n_b$ is set to be $2^{\max(5, bit\text{-}depth - 7)}$. Finally, the PROF refinement of the sample is calculated as $$\Delta I(i, j) = g_x(i, j) * \Delta v_x(i, j) + g_y(i, j) * \Delta v_y(i, j)$$

Harmonized Workflows of the BDOF and the PROF for Bi-Prediction

As discussed earlier, when one affine coding block is bi-predicted, the current PROF is applied in a unilateral manner. More specifically, the PROF sample refinements are separately derived and applied to the prediction samples in list L0 and L1. After that, the refined prediction signals, respectively from list L0 and L1, are averaged to generate the final bi-prediction signal of the block. This is in contrast to the BDOF design where the sample refinements are derived and applied to the bi-prediction signal. Such difference between the bi-prediction workflows of the BDOF and the PROF may be unfriendly to practical codec pipeline design.

To facilitate hardware pipeline design, one simplification method according to the current disclosure is to modify the bi-prediction process of the PROF such that the workflows of the two prediction refinement methods are harmonized. Specifically, instead of separately applying the refinement for each prediction direction, the proposed PROF method derives the prediction refinements once based on the control-point MVs of list L0 and L1; the derived prediction refinements are then applied to the combined L0 and L1 prediction signal to enhance the quality. Specifically, based on the MV difference as derived in equation (14), the final bi-prediction samples of one affine coding block are calculated by the proposed method as $$pred_{PROF}(i, 1) = \left(I^{(0)}(i, j) + I^{(1)}(i, j) + \Delta I(i, j) + o_{offset}\right) \gg shift \quad (18)$$

$$\Delta I(i, 1) = (g_x(i, j) * \Delta v_x(i, j) + g_y(i, j) * \Delta v_y(i, j) + 1) \gg 1$$

$$I^r(i, j) = I(i, j) + \Delta I(i, j)$$

where shift and $o_{offset}$ are the right shift value and the offset value that are applied to combine the L0 and L1 prediction signals for bi-prediction, which are equal to (15−bit-depth) and 1≪(14−bit-depth)+(2≪13), respectively. Moreover, as shown in (18), the clipping operation in the existing PROF design (as shown in (9)) is removed in the proposed method.

Figure 12:
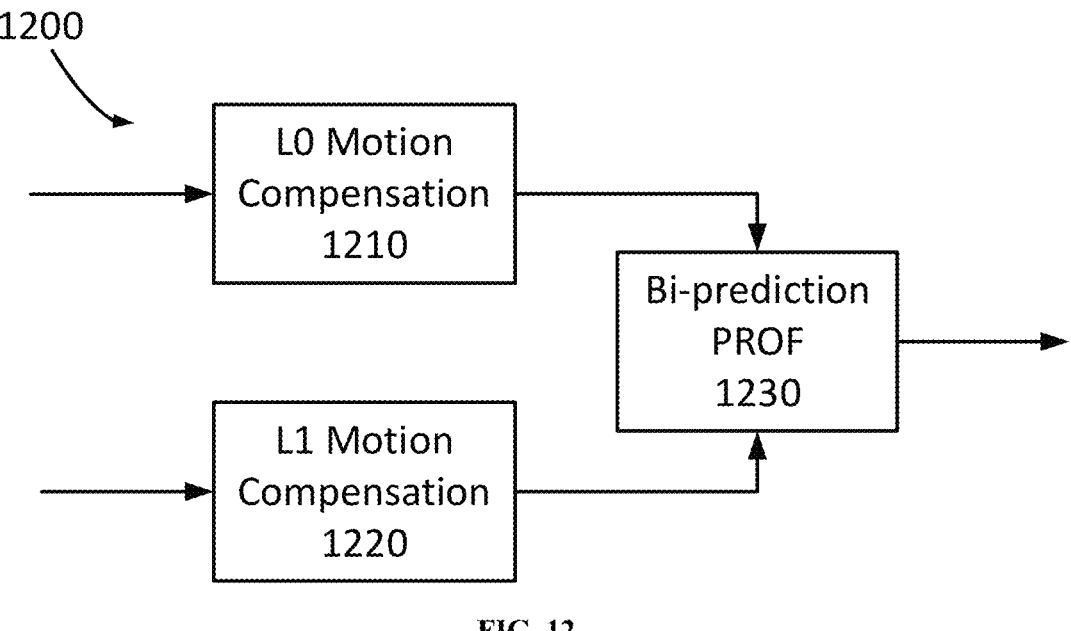
FIG. 12 is an illustration of a workflow of a PROF for bi-prediction, according to an example of the present disclosure.

FIG. 12 shows an illustration of a PROF process when the proposed bi-prediction PROF method is applied, in accordance with the present disclosure. PROF process 1200 includes L0 motion compensation 1210, L1 motion compensation 1220, and bi-prediction PROF 1230. L0 motion compensation 1210, for example, can be a list of motion compensation samples from a previous reference picture. The previous reference picture is a reference picture previous from the current picture in the video block. L1 motion compensation 1220, for example, can be a list of motion compensation samples from the next reference picture. The next reference picture is a reference picture after the current picture in the video block. Bi-prediction PROF 1230 intakes motion compensation samples from L1 Motion Compensation 1210 and L1 Motion Compensation 1220 and output bi-prediction samples, as described above.

FIG. 12 illustrates the corresponding PROF process when the proposed bi-prediction PROF method is applied. PROF process 1200 includes L0 motion compensation 1210, L1 motion compensation 1220, and bi-prediction PROF 1230. L0 motion compensation 1210, for example, can be a list of motion compensation samples from a previous reference picture. The previous reference picture is a reference picture previous from the current picture in the video block. L1 motion compensation 1220, for example, can be a list of motion compensation samples from the next reference picture. The next reference picture is a reference picture after the current picture in the video block. Bi-prediction PROF 1230 intakes motion compensation samples from L1 Motion Compensation 1210 and L1 Motion Compensation 1220 and output bi-prediction samples, as described above.

Figure 13:
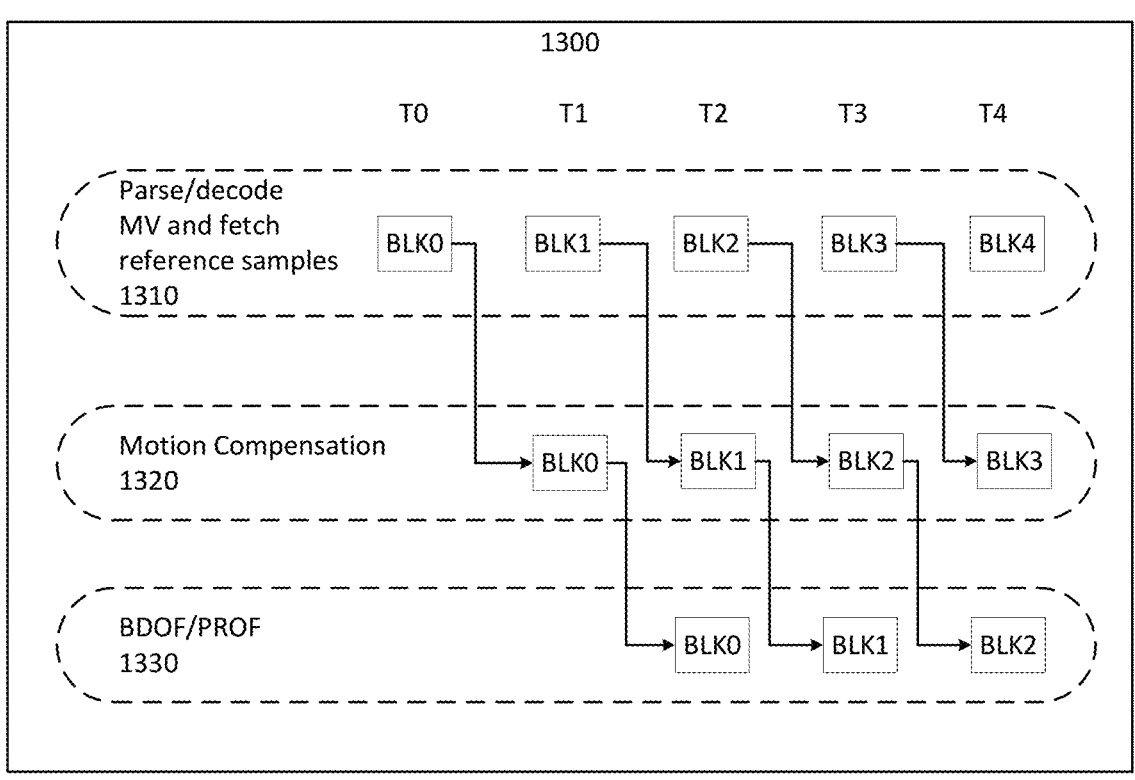
FIG. 13 is an illustration of the pipeline stages of a BDOF and a PROF process, according to the present disclosure.

To demonstrate the potential benefit of the proposed method for hardware pipeline design, FIG. 13 shows one example to illustrate the pipeline stage when both the BDOF and the proposed PROF are applied. In FIG. 13, the decoding process of one inter block mainly includes three steps:
1) Parse/decode the MVs of the coding block and fetch the reference samples.
2) Generate the L0 and/or L1 prediction signals of the coding block.
3) Perform sample-wise refinement of the generated bi-prediction samples based on the BDOF when the coding block is predicted by one non-affine mode or the PROF when the coding block is predicted by affine mode.

FIG. 13 shows an illustration of an example pipeline stage when both the BDOF and the proposed PROF are applied, in accordance with the present disclosure. FIG. 13 demonstrates the potential benefit of the proposed method for hardware pipeline design. Pipeline stage 1300 includes parse/decode MV and fetch reference samples 1310, motion compensation 1320, BDOF/PROF 1330. The Pipeline stage 1300 will encode video blocks BLK0, BKL1, BKL2, BKL3, and BLK4. Each video block will begin in parse/decode MV and fetch reference samples 1310 and move to motion compensation 1320 and then motion compensation 1320, BDOF/PROF 1330, sequentially. This means that BLK0 will not begin in the pipeline stage 1300 process until BLK0 moves onto Motion Compensation 1320. The same for all the stages and video blocks as time goes from T0 to T1, T2, T3, and T4.

In FIG. 13, the decoding process of one inter block mainly includes three steps:

First, parse/decode the MVs of the coding block and fetch the reference samples.

Second, generate the L0 and/or L1 prediction signals of the coding block.

Third, perform sample-wise refinement of the generated bi-prediction samples based on the BDOF when the coding block is predicted by one non-affine mode or the PROF when the coding block is predicted by affine mode.

As shown in FIG. 13, after the proposed harmonization method is applied, both the BDOF and the PROF are directly applied to the bi-prediction samples. Given that the BDOF and the PROF are applied to different types of coding blocks (i.e., the BDOF is applied to non-affine blocks and the PROF is applied to the affine blocks), the two coding tools cannot be invoked simultaneously. Therefore, their corresponding decoding processes can be conducted by sharing the same pipeline stage. This is more efficient than the existing PROF design where it is hard to assign the same pipeline stage for both the BDOF and the PROF due to their different workflow of bi-prediction.

In the above discussion, the proposed method only considers the harmonization of the workflows of the BDOF and the PROF. However, according to the existing designs, the basic operating unit for the two coding tools are performed at different sizes. Specifically, for the BDOF, one coding block is split into multiple subblocks with a size of $W_s \times H_s$, where $W_s = \min(W, 16)$ and $H_s = \min(H, 16)$, where W and H are the width and the height of the coding block. The BODF operations, such as gradient calculation and sample refinement derivation, are performed independently for each subblock. On the other hand, as described earlier, an affine coding block is divided into 4×4 subblocks, with each subblock assigned one individual MV derived based on either 4-parameter or 6-parameter affine models. Because the PROF is only applied to affine block, its basic operation unit is 4×4 subblock. Similar to the bi-prediction workflow problem, using different basic operating unit size for PROF from BDOF is also unfriendly for hardware implementations and makes it difficult for the BDOF and the PROF to share the same pipeline stage of the whole decoding process. In order to solve such issue, in one embodiment, it is proposed to align the subblock size of the affine mode to be the same as that of the BDOF. Specifically, according to the proposed method, when one coding block is coded by affine mode, it will be split into subblocks with a size of $W_s \times H_s$, where $W_s = \min(W, 16)$ and $H_s = \min(H, 16)$, where W and H are the width and the height of the coding block. Each subblock is assigned one individual MV and considered as one independent PROF operating unit. It's worth mentioning that an independent PROF operating unit ensures that the PROF operation on top of it is performed without referencing the information from neighboring PROF operating units. Specifically, the PROF MV difference at one sample position is calculated as the difference between the MV at the sample position and the MV at the center of the PROF operating unit in which the sample is located; the gradients used by the PROF derivation are calculated by padding samples along each PROF operating unit. The asserted benefits of the proposed method mainly include the following aspects: 1) simplified pipeline architecture with unified basic operating unit size for both motion compensation and BDOF/PROF refinement; 2) reduced memory bandwidth usage due to the enlarged subblock size for affine motion compensation; 3) reduced per-sample computational complexity of fractional sample interpolation.

It should be also mentioned that because of the reduced computation complexity (i.e., item 3)) with the proposed method, the existing 6-tap interpolation filter constraint for affine coding blocks can be removed. Instead, the default 8-tap interpolation for non-affine coding blocks are also used for affine coding blocks. The overall computational complexity in this case can still compare favorably against the existing PROF design (that is based on 4×4 subblock with 6-tap interpolation filter).

Harmonization of Gradient Derivation for the BDOF and the PROF

As described earlier, both the BDOF and the PROF calculate the gradient of each sample inside the current coding block, which accesses one additional row/column of prediction samples on each side of the block. To avoid the additional interpolation complexity, the needed prediction samples in the extended region around the block boundary are directly copied from the integer reference samples. However, as pointed out in the section "problem statement," the integer samples at different locations are used to calculate the gradient values of the BDOF and the PROF.

To achieve one more uniform design, two methods are proposed in the following to unify the gradient derivation methods used by the BDOF and the PROF. In the first method, it is proposed to align the gradient derivation method of the PROF to be the same as that of the BDOF. Specifically, by the first method, the integer position used to generate the prediction samples in the extended region is determined by flooring down the fractional sample position, i.e., the selected integer sample position is located left to the fractional sample position (for horizontal gradients) and above the fractional sample position (for vertical gradients).

In the second method, it is proposed to align the gradient derivation method of the BDOF to be the same as that of the PROF. In more detail, when the second method is applied, the integer reference sample that is closest to the prediction sample is used for gradient calculations.

Figure 14:
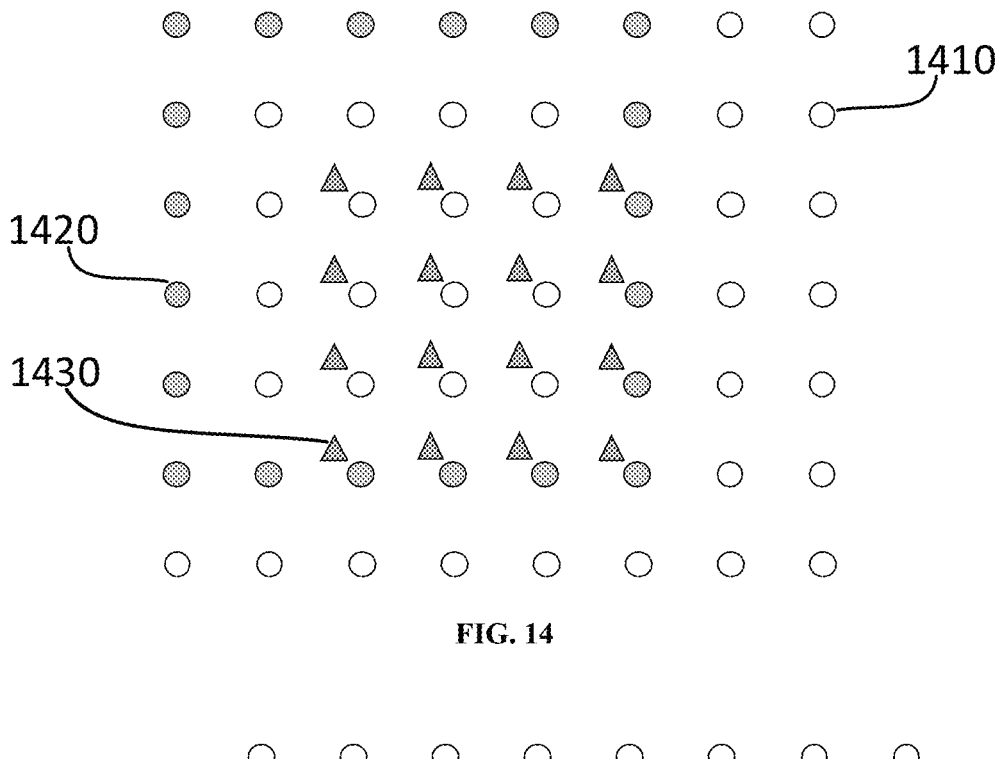
FIG. 14 is an illustration of a gradient derivation method of a BDOF, according to the present disclosure.

FIG. 14 shows an example of using the gradient derivation method of the BDOF, in accordance with the present disclosure. In FIG. 14, the blank circles represent reference samples at integer positions, triangles represent the fractional prediction samples of the current block, and gray circles represent the integer reference samples that used to fill the extended region of the current block.

Figure 15:
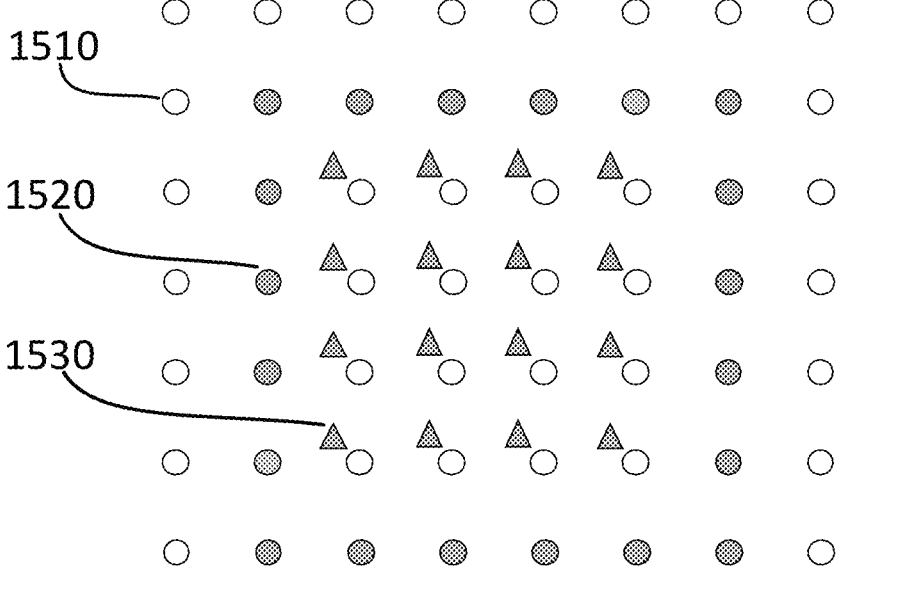
FIG. 15 is an illustration of a gradient derivation method of a PROF, according to the present disclosure.

FIG. 15 shows an example of using the gradient derivation method of the PROF, in accordance with the present disclosure. FIG. 15, the blank circles represent reference samples at integer positions, triangles represent the fractional prediction samples of the current block, and gray circles represent the integer reference samples that used to fill the extended region of the current block.

FIG. 14 and FIG. 15 illustrate the corresponding integer sample locations that are used for the derivation of the gradients for the BDOF and the PROF when the first method (FIG. 12) and the second method (FIG. 13) are applied, respectively. In FIG. 14 and FIG. 15, the blank circles represent reference samples at integer positions, triangles represent the fractional prediction samples of the current block and patterned circles represent the integer reference samples that are used to fill the extended region of the current block for gradient derivation.

Additionally, according to the existing BDOF and PROF designs, the prediction sample padding is conducted at different coding levels. Specifically, for the BDOF, the padding is applied along the boundaries of each sbWidth× sbHeight subblock where sbWidth=min(CUWidth, 16) and sbHeight=min(CUHeight, 16). CUWidth and CUHeight are the width and height of one CU. On the other hand, the padding of the PROF is always applied on a 4×4 subblock level. In the above discussion, only the padding method is unified between the BDOF and the PROF while the padding subblock sizes are still different. This is also not friendly for practical hardware implementation given that different modules need to be implemented for the padding processes of the BDOF and the PROF. To achieve one more unified design, it is proposed to unify the subblock padding size of the BDOF and the PROF. In one embodiment of the disclosure, it is proposed to apply the prediction sample padding of the BDOF at a 4×4 level. Specifically, by this method, the CU is firstly divided into multiple 4×4 subblocks; after the motion compensation of each 4×4 subblock, the extended samples along top/bottom and left/right boundaries are padded by copying the corresponding integer sample positions.

FIGS. 18A, 18B, 18C, and 18D illustrate one example where the proposed padding method is applied to one 16×16 BDOF CU, where dash lines represent 4×4 subblock boundaries and gray bands represent padded samples of each 4×4 subblock.

Figures 18A, 18B, 18C, 18D:
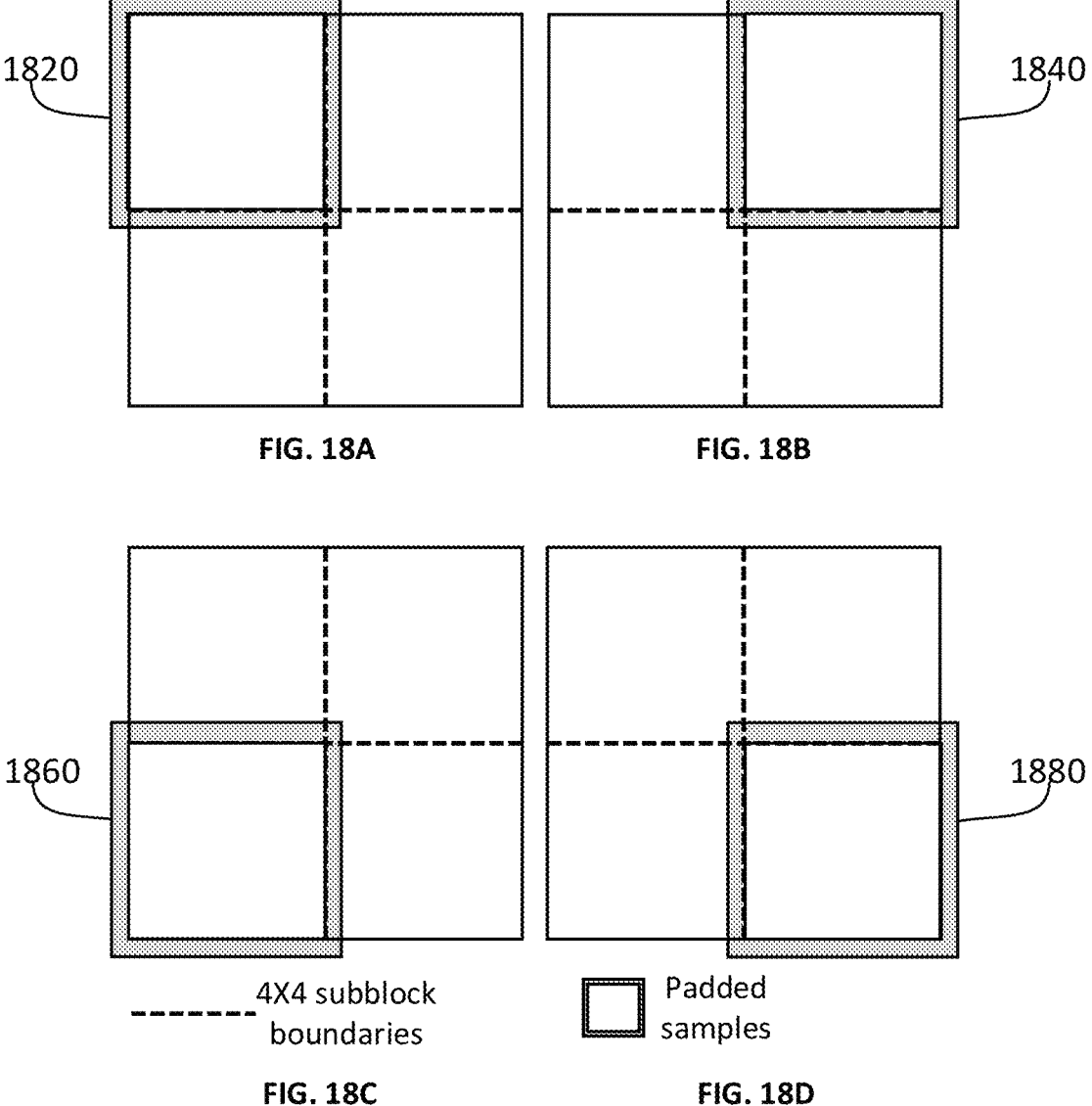
FIG. 18A is a diagram illustrating a proposed padding method applied to a 16×16 BDOF CU, according to an example of the present disclosure.
FIG. 18B is a diagram illustrating a proposed padding method applied to a 16×16 BDOF CU, according to an example of the present disclosure.
FIG. 18C is a diagram illustrating a proposed padding method applied to a 16×16 BDOF CU, according to an example of the present disclosure.
FIG. 18D is a diagram illustrating a proposed padding method applied to a 16×16 BDOF CU, according to an example of the present disclosure.

FIG. 18A shows a proposed padding method applied to a 16×16 BDOF CU, where the dash lines represent a top left 4×4 subblock boundary 1820, according to the present disclosure.

FIG. 18B shows a proposed padding method applied to a 16×16 BDOF CU, where the dash lines represent a top right 4×4 subblock boundary 1840, according to the present disclosure.

FIG. 18C shows a proposed padding method applied to a 16×16 BDOF CU, where the dash lines represent a bottom left 4×4 subblock boundary 1860, according to the present disclosure.

FIG. 18D shows a proposed padding method applied to a 16×16 BDOF CU, where the dash lines represent a bottom right 4×4 subblock boundary 1880, according to the present disclosure.

FIG. 10 shows a unified method of BDOF and PROF for decoding a video signal in accordance with the present disclosure. The method may be, for example, applied to a decoder.

In step 1010, the decoder may divide a video block to multiple non-overlapped video subblocks. The at least one of the multiple non-overlapped video subblocks may be associated with two motion vectors.

In step 1012, the decoder may obtain a first reference picture $I^{(0)}$ and a second reference picture $I^{(1)}$ associated with the two motion vectors of the at least one of the multiple non-overlapped video subblocks. The first reference picture $I^{(0)}$ is before a current picture and the second reference picture $I^{(1)}$ is after the current picture in display order.

In step 1014, the decoder may obtain first prediction samples $I^{(0)}(i,j)$'s of the video subblock from a reference block in the first reference picture $I^{(0)}$. The i and j may represent a coordinate of one sample with the current picture In step 1016, the decoder may obtain second prediction samples $I^{(1)}(i,j)$'s of the video subblock from a reference block in the second reference picture $I^{(1)}$.

In step 1018, the decoder may obtain horizontal and vertical gradient values of the first prediction samples $I^{(0)}(i,j)$'s and second prediction samples $I^{(1)}(i,j)$'s.

In step 1020, the decoder may obtain motion refinements for samples in the video subblock based on the BDOF when the video block is not coded in affine mode.

In step 1022, the decoder may obtain motion refinements for samples in the video subblock based on the PROF when the video block is coded in affine mode.

In step 1024, the decoder may obtain prediction samples of the video block based on the motion refinements.

High-Level Signaling Syntax to Enable/Disable the BDOF, PROF and DMVR

In the existing BDOF and PROF designs, two different flags are signaled in the SPS to control the enabling/disabling of the two coding tools separately. However, due to the similarity between the BDOF and the PROF, it is more desirable to enable and/or disable the BDOF and the PROF from high level by one same controlling flag. Based on such consideration, one new flag, which is called sps_bdof_prof_enabled_flag, is introduced at the SPS, as shown in Table 1. As shown in Table 1, the enabling and disabling of the BDOF is only dependent on the sps_bdof prof_enabled_flag. When the flag is equal to 1, the BDOF is enabled for coding the video content in the sequence. Otherwise, when sps_bdof_prof_enabled_flag is equal to 0, the BDOF will not be applied. On the other hand, in addition to the sps_bdof_prof_enabled flag, the SPS level affine control flag, i.e., sps_affine_enabled_flag, is also used to conditionally enable and disable the PROF. When both the flags sps_bdof_prof_enabled_flag and sps_affine_enabled_flag are equal to 1, the PROF is enabled for all the coding blocks that are coded in affine mode. When the flag sps_bdof_prof_enabled_flag is equal to 1 and sps_affine_enabled_flag is equal to 0, the PROF is disabled.

FIG. 11 shows a method of BDOF and PROF for decoding a video signal in accordance with the present disclosure. The method may be, for example, applied to a decoder.

In step 1110, the decoder may obtain a first reference picture $I^{(0)}$ and a second reference picture $I^{(1)}$ associated with a video block. The first reference picture $I^{(0)}$ is before a current picture and the second reference picture $I^{(1)}$ is after the current picture in display order.

In step 1112, the decoder may obtain first prediction samples $I^{(0)}(i,j)$ of the video block from a reference block in the first reference picture $I^{(0)}$. The i and j may represent a coordinate of one sample with the current picture In step 1114, the decoder may obtain second prediction samples $I^{(1)}(i,j)$ of the video block from a reference block in the second reference picture $I^{(1)}$.

In step 1116, the decoder may receive at least one flag. The at least one flag is signaled by an encoder in SPS and signals whether the BDOF and the PROF is enabled for a current video block.

In step 1118, the decoder may apply, when the at least one flag is enabled, PROF to derive the motion refinements of the video block based on the first prediction samples $I^{(0)}(i,j)$ and the second prediction samples $I^{(1)}(i,j)$ when the video block is coded in affine mode.

In step 1120, the decoder may obtain motion refinements for samples in the video block based on the BDOF being applied to the video block.

In step 1122, the decoder may obtain prediction samples of the video block based on the motion refinements.

TABLE 1

| Modified SPS syntax table with the proposed BDOF/PROF enabling/disabling flag | |
| --- | --- |
| | Descriptor |
| seq_parameter_set_rbsp( ) { | |
| ...... | |
|   if( sps_temporal_mvp_enabled_flag ) | |
|     sps_sbtmvp_enabled_flag | u(1) |
|   sps_amvr_enabled_flag | u(1) |
|   sps_bdof_prof_enabled_flag | u(1) |
|   sps_smvd_enabled_flag | u(1) |
|   sps_affine_amvr_enabled_flag | u(1) |
|   sps_dmvr_enabled_flag | u(1) |
|   if(sps_bdof_prof_enabled_flag \|\| sps_dmvr_enabled_flag) | |
|     sps_bdof_prof_dmvr_slice_present_flag | u(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   sps_cclm_enabled_flag | u(1) |
| ...... | |
| } | | sps_bdof_prof_enabled_flag specifies whether the bidirectional optical flow and predition refinement with optical flow is enabled or not. When sps_bdof_prof_enabled_flag is equal to 0, both the bidirectional optical flow and prediction refinement with optical flow are disabled. When sps_bdof_prof_enabled_flag is equal to 1 and sps_affine_enabled_flag is equal to 1, both bidirectional optical flow and prediction refinement with optical flow are enabled. Otherwise (sps_bdof prof_enabled_flag is equal to 1 and sps_affine_enabled_flag is equal to 0) bidirectional optical flow is enabled and prediction refinement with optical flow is disabled.

sps_bdof_prof_dmvr_slice_preset_flag specifies when the flag slice_disable_bdof prof_dmvr_flag is signaled at slice level. When the flag is equal to 1, the syntax slice_disable_bdof_prof_dmvr_flag is signaled for each slice that refers to the current sequence parameter set. Otherwise (when sps_bdof_prof_dmvr_slice_present_flag is equal to 0), the syntax slice_disabled_bdof_prof_dmvr_flag will not be signaled at slice level. When the flag is not signaled, it is inferred to be 0.

In addition to the above SPS BDOF/PROF syntax, it is proposed to introduce another control flag at slice level, i.e., slice_disable_bdof_prof_dmvr_flag is introduced for disabling BDOF, PROF and DMVR. A SPS flag sps_bdof_prof_dmvr_slice_present_flag, which is signalled in the SPS when either of DMVR or BDOF/PROF sps level control flags are true, is used to indicate the presence of slice_disable_bdof_prof_dmvr_flag. If present, the slice_disable_bdof_dmvr_flag is signaled. Table 2 illustrates the modified slice header syntax table after the proposed syntax are applied.

TABLE 2

Modified SPS syntax table with the proposed
BDOF/PROF enabling/disabling flag

| seq_parameter_set_rbsp( ) { | |
|---|---|
| if( sps_bdof_prof_dmvr_slice_present_flag ) | |
| slice_disable_bdof_prof_dmvr_enabled_flag | u(1) |
| ...... | |

Early Termination of the PROF Based on Control-Point MV Difference

According to the current PROF design, the PROF is always invoked when one coding block is predicted by the affine mode. However, as indicated in equation (6) and (7), the subblock MVs of one affine block is derived from the control-point MVs. Therefore, when the difference between the control-point MVs are relatively small, the MVs at each sample position should be consistent. In such case, the benefit of applying the PROF could be very limited. Therefore, to further reduce the average computational complexity of the PROF, it is proposed to adaptively skip the PROF based sample refinement based on the maximum MV difference between the sample-wise MV and the subblock-wise MV within one 4×4 subblock. Because the values of the PROF MV difference of the samples inside one 4×4 subblock are symmetric about the subblock center, the maximum horizontal and vertical PROF MV difference can be calculated based on the equation (10) as $$\Delta v_x^{max} = 6*(c + d) \qquad (19)$$

$$\Delta v_y^{max} = 6*(e + f)$$

According to the current disclosure, different metrics may be used in determining when the MV difference is small enough to skip the PROF process.

In one example, based on the equation (19), the PROF process can be skipped when the sum of the absolute maximal horizontal MV difference and the absolute maximal vertical MV difference is not greater than one predefined threshold, i.e., $$|\Delta v_x^{max}| + |\Delta v_y^{max}| \le thres \qquad (20)$$

In another example, when the maximum value of $|\Delta v_x^{max}|$ and $|\Delta v_y^{max}|$ is not greater than a threshold, the PROF process can be skipped.

$$MAX(|\Delta v_x^{max}|, |\Delta v_y^{max}|) \le thres \qquad (21)$$

where MAX(a, b) is a function that returns the larger value between input values a and b.

In additional to the two examples above, the spirit of the current disclosure is also applicable to the cases when other metrics are used in determining if the MV difference is small enough for skipping the PROF process.

In the above method, the PROF is skipped based on the magnitude of the MV difference. On the other hand, in addition to the MV difference, the PROF sample refinement is also calculated based on the local gradient information at each sample location in one motion compensated block. For prediction blocks that contain less high-frequency details (e.g., the flat area), the gradient values tend to be small such that the values of the derived sample refinements should be small. Taking this into consideration, according to another embodiment of the current disclosure, it is proposed to only apply the PROF to the predication samples of the blocks which contain enough high-frequency information.

Different metrics may be used in determining if a block contains enough high-frequency information so that the PROF process is worth to be invoked for the block. In one example, the decision is made based on the average magnitude (i.e., absolute value) of the gradients of the samples within the prediction block. When the average magnitude is smaller than one threshold, then the prediction block is classified as flat area and the PROF should not be applied; otherwise, the prediction block is considered to contain sufficient high-frequency details where the PROF is still applicable. In another example, the maximum magnitude of the gradients of the samples within the prediction block may be used. If the maximum magnitude is smaller than one threshold, PROF is to be skipped for the block. In yet another example, the difference between the maximum sample value and the minimum sample value, $I_{max}-I_{min}$, of a prediction block may be used to determine if PROF is to be applied to the block. If such a difference value is less than a threshold, PROF is to be skipped for the block. It is worth noting that the spirit of the disclosure is also applicable to the cases where some other metrics are used in determining if a given block contains enough high-frequency information or not.

Handle the Interaction Between the PROF and the LIC for Affine Mode

Because the neighboring reconstructed samples (i.e., template) of a current block are used by the LIC to derive the linear model parameters, the decoding of one LIC coding block is dependent on the full reconstruction of its neighboring samples. Due to such interdependency, for practical hardware implementations, LIC needs to be performed in the reconstruction stage where neighboring reconstructed samples become available for LIC parameter derivation. Because block reconstruction must be performed sequentially (i.e., one by one), throughput (i.e., the amount of work that can be done in parallel per unit time) is one important issue to consider when jointly applying other coding methods to the LIC coding blocks. In this section, two methods are proposed to handle the interaction when both the PROF and the LIC are enabled for affine mode.

In the first embodiment of this disclosure, it is proposed to exclusively apply the PROF mode and the LIC mode for one affine coding block. As discussed earlier, in the existing design, the PROF is implicitly applied for all affine blocks without signaling while one LIC flag is signaled or inherited at coding block level to indicate whether the LIC mode is applied to one affine block or not. According to the method in the disclosure, it is proposed to conditionally apply the PROF based on the value of the LIC flag of one affine block. When the flag is equal to one, only the LIC is applied by adjusting the prediction samples of the whole coding block based on the LIC weight and offset. Otherwise (i.e., the LIC flag is equal to zero), the PROF is applied to the affine coding block to refine the prediction samples of each sub-block based on optical flow model.

Figures 17A, 17B:
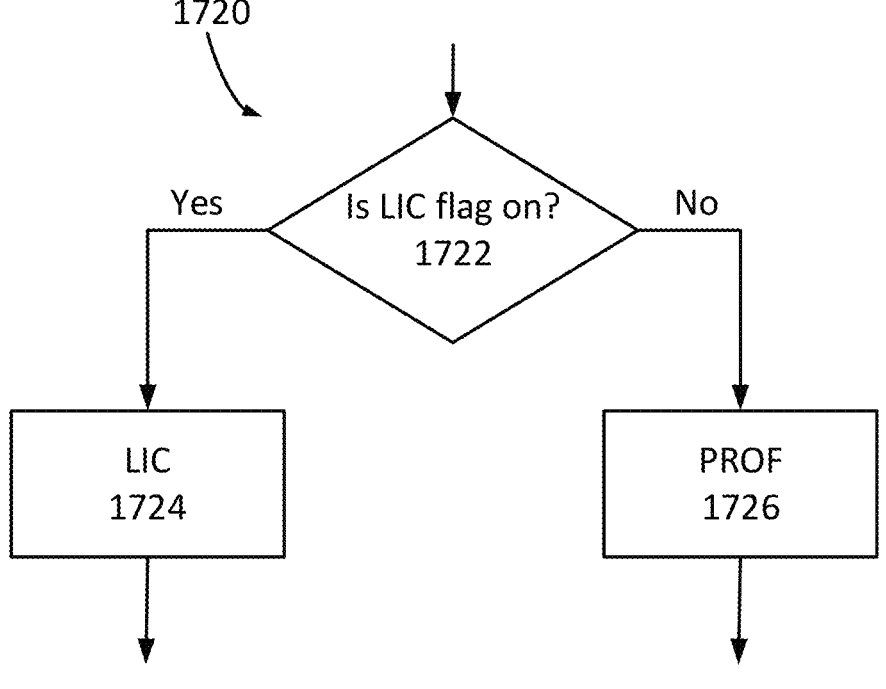
FIG. 17A is an illustration of exclusively enabling the PROF and the LIC for affine mode, according to an example of the present disclosure.
FIG. 17B is an illustration of jointly enabling the PROF and the LIC for affine mode, according to an example of the present disclosure.

FIG. 17A illustrates one example flowchart of the decoding process based on the proposed method where the PROF and the LIC are disallowed to be applied simultaneously.

FIG. 17A shows an illustration of a decoding process based on the proposed method where the PROF and the LIC are disallowed, in accordance with the present disclosure. The decoding process 1720 includes Is LIC flag on? 1722 step, LIC 1724, and PROF 1726. Is LIC flag on? 1722 is a step that determines whether an LIC flag is set and the next step is taken according to that determination. LIC 1724 is the application of LIC is the LIC flag is set. PROF 1726 is the application of PROF if the LIC flag is not set.

In the second embodiment of this disclosure, it is proposed to apply the LIC after the PROF to generate the prediction samples of one affine block. Specifically, after the sub-block-based affine motion compensation is done, the prediction samples are refined based on the PROF sample refinement; then, the LIC is conducted by applying a pair of weight and offset (as derived from the template and its reference samples) to the PROF-adjusted prediction samples to obtain the final prediction samples of the block, as illustrated as $$P[x] = \alpha * (P_r[x+v] + \Delta I[x]) + \beta \qquad (22)$$

where $P_r[x+v]$ is the reference block of the current block indicated by the motion vector v; $\alpha$ and $\beta$ are the LIC weight and offset; $P[x]$ is the final prediction block; $\Delta I[x]$ is the PROF refinement as derived in (17).

FIG. 17B shows an illustration of a decoding process where the PROF and the LIC are applied, in accordance with the present disclosure. The decoding process 1760 includes Affine motion compensation 1762, LIC parameter derivation 1764, PROF 1766, and LIC sample adjustment 1768. The Affine motion compensation 1762 applies affine motion and is an input to LIC parameter derivation 1764 and PROF 1766. LIC parameter derivation 1764 is applied to derive LIC parameters. PROF 1766 is PROF being applied. LIC sample adjustment 1768 is LIC weight and offset parameters being combined with PROF.

FIG. 17B illustrates an exemplar decoding workflow when the second method is applied. As shown in FIG. 17B, because the LIC uses the template (i.e., neighboring reconstructed samples) to calculate the LIC linear model, the LIC parameters can be immediately derived as soon as the neighboring reconstructed samples become available. This means that the PROF refinement and the LIC parameter derivation can be carried out at the same time.

The LIC weight and offset (i.e., $\alpha$ and $\beta$) and the PROF refinement (i.e., $\Delta I[x]$) are in general floating numbers. For friendly hardware implementations, those floating number operations are usually implemented as a multiplication with one integer value followed by a right-shift operation by a number of bits. In the existing LIC and PROF design, since the two tools are designed separately, two different right-shifts, by $N_{LIC}$ bits and $N_{PROF}$ bits respectively, are applied at the two stages.

According to a third embodiment of the disclosure, to improve the coding gain in case PROF and LIC are applied jointly to an affine coding block, it is proposed to apply the LIC-based and PROF-based sample adjustments at high precision. This is done by combining their two right-shift operations into one and apply it at the end to derive the final prediction samples (as shown in (12)) of the current block.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 19:
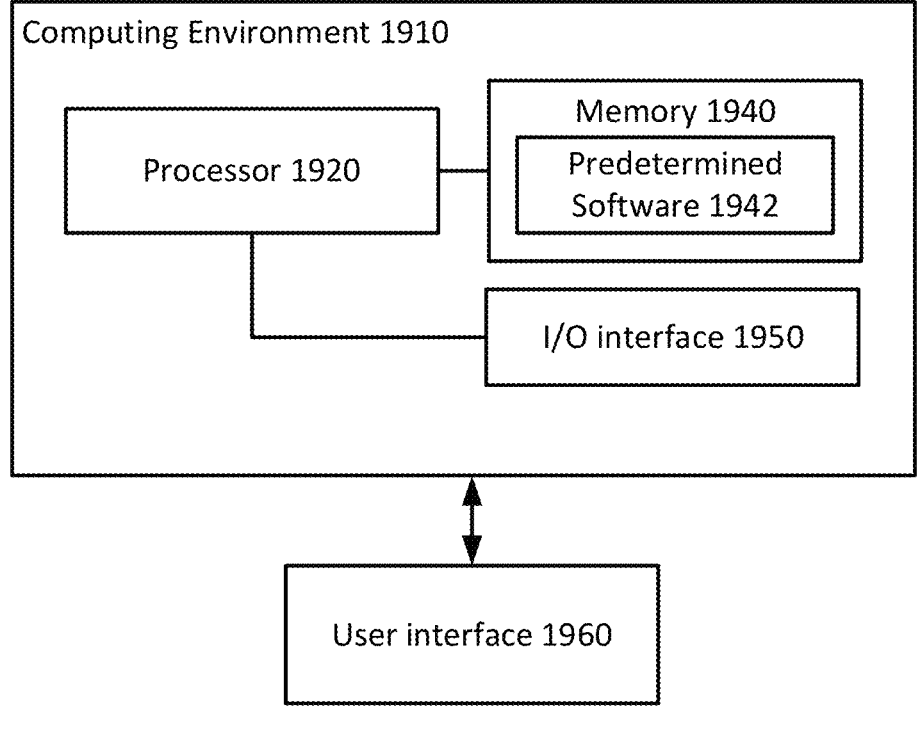
FIG. 19 is a diagram illustrating a computing environment coupled with a user interface, according to an example of the present disclosure.

FIG. 19 shows a computing environment 1910 coupled with a user interface 1960. The computing environment 1910 can be part of a data processing server. The computing environment 1910 includes processor 1920, memory 1940, and I/O interface 1950.

The processor 1920 typically controls overall operations of the computing environment 1910, such as the operations associated with the display, data acquisition, data communications, and image processing. The processor 1920 may include one or more processors to execute instructions to perform all or some of the steps in the above-described methods. Moreover, the processor 1920 may include one or more modules that facilitate the interaction between the processor 1920 and other components. The processor may be a Central Processing Unit (CPU), a microprocessor, a single chip machine, a GPU, or the like.

The memory 1940 is configured to store various types of data to support the operation of the computing environment 1910. Memory 1940 may include predetermine software 1942. Examples of such data comprise instructions for any applications or methods operated on the computing environment 1910, video datasets, image data, etc. The memory 1940 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1950 provides an interface between the processor 1920 and peripheral interface modules, such as a keyboard, a click wheel, buttons, and the like. The buttons may include but are not limited to, a home button, a start scan button, and a stop scan button. The I/O interface 1950 can be coupled with an encoder and decoder.

In some embodiments, there is also provided a non-transitory computer-readable storage medium comprising a plurality of programs, such as comprised in the memory 1940, executable by the processor 1920 in the computing environment 1910, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

Here, the computing environment 1910 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video encoding, comprising:
dividing a video block of a current picture into multiple video subblocks, wherein at least one of the multiple video subblocks is associated with two motion vectors;
determining a first reference picture and a second reference picture associated with the two motion vectors of the at least one of the multiple video subblocks, wherein the first reference picture is before the current picture and the second reference picture is after the current picture in display order;
determining first prediction samples of the video subblock from the first reference picture;
determining second prediction samples of the video subblock from the second reference picture;
determining horizontal and vertical gradient values of the first prediction samples and second prediction samples for bi-directional optical flow (BDOF) when the BDOF is applied;
determining horizontal and vertical gradient values of the first prediction samples and second prediction samples for prediction refinement with optical flow (PROF) when the PROF is applied;
determining motion refinements for samples in the video subblock according to the horizontal and vertical gradient values for the BDOF when the BDOF is applied;
determining motion refinements for samples in the video subblock according to the horizontal and vertical gradient values for the PROF when the PROF is applied; and
determining prediction samples of the video block based on the motion refinements;
wherein the method further comprises:
deriving extended prediction samples along left and right boundaries of first and second prediction blocks of the video subblock by copying from integer reference samples that are closest to respective fractional prediction samples in a horizontal direction; and
deriving extended prediction samples along top and bottom boundaries of first and second prediction blocks of the video subblock by copying from integer reference samples that are closest to respective fractional prediction samples in a vertical direction.

2. The method of claim 1, wherein each video subblock comprises 4 samples in width and 4 samples in height.

3. The method of claim 1, wherein:
the BDOF is applied in a case that the video block is coded in a non-affine mode, wherein the non-affine mode comprises a translational mode; and
the PROF is applied in a case that the video block is coded in an affine mode, wherein the affine mode comprises one of a 4-parameter affine mode or a 6-parameter affine mode.

4. The method of claim 1, wherein the horizontal and vertical gradient values are obtained by applying a right-shifting operation.

5. The method of claim 1, wherein a bit-depth of video data is equal to 12.

6. The method of claim 1, wherein a bit-depth of video data is greater than 12.

7. The method of claim 1, further comprising:
determining not to apply prediction refinement with optical flow (PROF) for the video block based on a difference between control-point motion vectors for the video block; and
wherein determining the motion refinements for the samples in the video subblock according to the horizontal and vertical gradient values for the PROF when the PROF is applied comprises:
determining the motion refinements for the samples in the video subblock according to the horizontal and vertical gradient values for the PROF and a motion vector difference when the PROF is applied.

8. A computing device, comprising:
one or more processors;
a non-transitory computer-readable storage medium storing instructions executable by the one or more processors, wherein the one or more processors are configured to:
divide a video block of a current picture into multiple video subblocks, wherein at least one of the multiple video subblocks is associated with two motion vectors;
determine a first reference picture and a second reference picture associated with the two motion vectors of the at least one of the multiple video subblocks, wherein the first reference picture is before the current picture and the second reference picture is after the current picture in display order;
determine first prediction samples of the video subblock from the first reference picture;
determine second prediction samples of the video subblock from the second reference picture;
determine horizontal and vertical gradient values of the first prediction samples and second prediction samples for bi-directional optical flow (BDOF) when the BDOF is applied;
determine horizontal and vertical gradient values of the first prediction samples and second prediction samples for prediction refinement with optical flow (PROF) when the PROF is applied;
determine motion refinements for samples in the video subblock according to the horizontal and vertical gradient values for the BDOF when the BDOF is applied;
determine motion refinements for samples in the video subblock according to the horizontal and vertical gradient values for the PROF when the PROF is applied; and determine prediction samples of the video block based on the motion refinements;

wherein the one or more processors are further configured to:

derive extended prediction samples along left and right boundaries of first and second prediction blocks of the video subblock by copying from integer reference samples that are closest to respective fractional prediction samples in a horizontal direction; and derive extended prediction samples along top and bottom boundaries of first and second prediction blocks of the video subblock by copying from integer reference samples that are closest to respective fractional prediction samples in a vertical direction.

9. The computing device of claim 8, wherein each video subblock comprises 4 samples in width and 4 samples in height.

10. The computing device of claim 8, wherein:

the BDOF is applied in a case that the video block is coded in a non-affine mode, wherein the non-affine mode comprises a translational mode; and the PROF is applied in a case that the video block is coded in an affine mode, wherein the affine mode comprises one of a 4-parameter affine mode or a 6-parameter affine mode.

11. The computing device of claim 8, wherein the horizontal and vertical gradient values are obtained by applying a right-shifting operation.

12. The computing device of claim 8, wherein a bit-depth of video data is equal to 12.

13. The computing device of claim 8, wherein a bit-depth of video data is greater than 12.

14. The computing device of claim 8, wherein the one or more processors are further configured to:

determine not to apply prediction refinement with optical flow (PROF) for the video block based on a difference between control-point motion vectors for the video block; and wherein determine the motion refinements for the samples in the video subblock according to the horizontal and vertical gradient values for the PROF when the PROF is applied comprises:

determine the motion refinements for the samples in the video subblock according to the horizontal and vertical gradient values for the PROF and a motion vector difference when the PROF is applied.

15. A method for transmitting a bitstream, comprising:

generating the bitstream by performing a method for video encoding; and transmitting the bitstream, wherein the method for video encoding comprises:

dividing a video block of a current picture into multiple video subblocks, wherein at least one of the multiple video subblocks is associated with two motion vectors;

determining a first reference picture and a second reference picture associated with the two motion vectors of the at least one of the multiple video subblocks, wherein the first reference picture is before the current picture and the second reference picture is after the current picture in display order;

determining first prediction samples of the video subblock from the first reference picture;

determining second prediction samples of the video subblock from the second reference picture;

determining horizontal and vertical gradient values of the first prediction samples and second prediction samples for bi-directional optical flow (BDOF) when the BDOF is applied;

determining horizontal and vertical gradient values of the first prediction samples and second prediction samples for prediction refinement with optical flow (PROF) when the PROF is applied;

determining motion refinements for samples in the video subblock according to the horizontal and vertical gradient values for the BDOF when the BDOF is applied;

determining motion refinements for samples in the video subblock according to the horizontal and vertical gradient values for the PROF when the PROF is applied; and determining prediction samples of the video block based on the motion refinements;

wherein the method for video encoding further comprises:

deriving extended prediction samples along left and right boundaries of first and second prediction blocks of the video subblock by copying from integer reference samples that are closest to respective fractional prediction samples in a horizontal direction; and deriving extended prediction samples along top and bottom boundaries of first and second prediction blocks of the video subblock by copying from integer reference samples that are closest to respective fractional prediction samples in a vertical direction.

16. The method of claim 15, wherein each video subblock comprises 4 samples in width and 4 samples in height.

17. The method of claim 15, wherein:

the BDOF is applied in a case that the video block is coded in a non-affine mode, wherein the non-affine mode comprises a translational mode; and the PROF is applied in a case that the video block is coded in an affine mode, wherein the affine mode comprises one of a 4-parameter affine mode or a 6-parameter affine mode.

18. The method of claim 15, wherein a bit-depth of video data is equal to 12.

19. The method of claim 15, wherein a bit-depth of video data is greater than 12.

20. The method of claim 15, wherein the method for video encoding further comprises:

determining not to apply prediction refinement with optical flow (PROF) for the video block based on a difference between control-point motion vectors for the video block; and wherein determining the motion refinements for the samples in the video subblock according to the horizontal and vertical gradient values for the PROF when the PROF is applied comprises:

determining the motion refinements for the samples in the video subblock according to the horizontal and vertical gradient values for the PROF and a motion vector difference when the PROF is applied.

* * * * *